US006441356B1

(12) United States Patent
Mandella et al.

(10) Patent No.: US 6,441,356 B1
(45) Date of Patent: Aug. 27, 2002

(54) FIBER-COUPLED, HIGH-SPEED, ANGLED-DUAL-AXIS OPTICAL COHERENCE SCANNING MICROSCOPES

(75) Inventors: Michael J. Mandella, Cupertino; Mark H. Garrett, Morgan Hill; Gordon S. Kino, Stanford, all of CA (US)

(73) Assignee: Optical Biopsy Technologies, San Jose, CA (US)

( * ) Notice: Subject to any disclaimer, the term of this patent is extended or adjusted under 35 U.S.C. 154(b) by 75 days.

(21) Appl. No.: 09/628,119

(22) Filed: Jul. 28, 2000

(51) Int. Cl.[7] .............................................. G02B 26/08
(52) U.S. Cl. .................... 250/201.3; 250/235; 359/215; 359/385
(58) Field of Search ............................. 250/201.3, 234, 250/235; 359/203, 205, 206, 210, 212, 214, 215, 223, 368, 372, 373, 385, 389

(56) References Cited

U.S. PATENT DOCUMENTS

| | | | | |
|---|---|---|---|---|
| 5,120,953 A | * | 6/1992 | Harris ...................... | 250/227.2 |
| 5,161,053 A | | 11/1992 | Dabbs ......................... | 359/384 |
| 5,321,501 A | | 6/1994 | Swanson et al. ............. | 356/345 |
| 5,969,854 A | | 10/1999 | Stelzer et al. ................ | 359/385 |
| 5,973,828 A | * | 10/1999 | Webb .......................... | 359/385 |
| 6,028,306 A | | 2/2000 | Hayashi ....................... | 250/235 |
| 6,057,952 A | | 5/2000 | Kubo et al. .................. | 359/196 |
| 6,064,518 A | | 5/2000 | Stelzer et al. ................ | 359/368 |
| 6,069,698 A | | 5/2000 | Ozawa et al. ................ | 356/345 |
| 6,088,145 A | | 7/2000 | Dickensheets et al. ....... | 359/196 |
| 6,118,580 A | * | 9/2000 | Webb .......................... | 359/385 |
| 6,134,003 A | * | 10/2000 | Tearney et al. .............. | 356/450 |
| 6,134,009 A | * | 10/2000 | Zavislan ...................... | 356/364 |
| 6,351,325 B1 | * | 2/2002 | Mandella et al. ............ | 359/210 |

FOREIGN PATENT DOCUMENTS

DE    4326473    2/1995

OTHER PUBLICATIONS

Rollins et al., "SNR analysis of conventional and optimal fibe–optic low–coherence interferometer topologies", In Cohernece Domain Optical Methods in Biomedical Science and Clinical Applications IV, Proceedings of SPIE, vol. 3915, 2000, pp. 60–67.
Rollins et al., "Optimal interferometer designs for optical coherence tomography", Optics Letters, vol. 24, No. 21, Nov. 1, 1999, pp. 1484–1486.
Podoleanu, "Unbalanced versus balanced operation in an optical coherence tomography system", Applied Optics, vol. 39, No. 1, Jan. 1, 2000, pp. 173–182.
Lindek et al., "Optical transfer functions for Confocal theta fluorescence microscopy", J. Opt. Soc. Am. A, vol. 13, No. 3, Mar. 1996, pp. 479–482.

(List continued on next page.)

Primary Examiner—Robert H. Kim
Assistant Examiner—Chih Cheng G Kao
(74) Attorney, Agent, or Firm—Lumen Intellectual Property Services

(57) ABSTRACT

This invention provides an angled-dual-axis optical coherence scanning microscope comprising a fiber-coupled, high-speed angled-dual-axis confocal scanning head and a vertical scanning unit. The angled-dual-axis confocal scanning head is configured such that an illumination beam and an observation beam intersect optimally at an angle $\theta$ within an object and the scanning is achieved by pivoting the illumination and observation beams jointly using a high-speed scanning element, thereby producing an arc-line scan. The vertical scanning unit causes the angled-dual-axis confocal scanning head to move towards or away from the object. Optical coherence detection is employed to provide temporal gating, thus detecting mostly single-scattered light and preventing multiple-scattered light from dominating the signal when imaging in a scattering medium. By incorporating MEMS scanning mirrors and fiber-optic components, the angled-dual-axis optical coherence scanning microscope can be miniaturized to provide a particularly powerful tool for in vivo medical imaging applications.

85 Claims, 11 Drawing Sheets

OTHER PUBLICATIONS

Stelzer et al., "Fundamental reduction of the observation volume in far–field light microscopy by detection orthogonal to the illumination axis: confocal theta microscopy", Optics Communications 111 91994), pp. 536–547.

Hell et al., "Far–field fluorescence microscopy with three–dimensional resolution in the 100–nm range", Journal of Microscopy, vol. 187, Pt. 1, Jul. 1997, pp. 1–7.

Stelzer et al., "A new tool for the observation of embryos and other large specimens: confocal theta fluorescence microscopy", Journal of Microscopy, vol. 179, Pt. 1, Jul. 1995, pp. 1–10.

Webb et al., "Confocal microscope with large field and working distance", Applied Optics, vol. 38, No. 22, Aug. 1, 1999, pp. 4870–4875.

Sinzinger et al., "Planar optical Confocal microscope for imaging and sensing" European Optical Society Topical Meetings Digest Series, vol. 9, Engelberg, Switzerland, Apr. 19996, pp. 1–3.

Klug et al., "Implementation of multilens micro–optical systems with large numerical aperture by stacking of microlenses", Applied Optics, vol. 38, No. 34, Dec. 1, 1999.

Drexler et al., "In vivo ultrahigh–resolution optical coherence tomography", Optics Letters, 21(17), 1999 pp. 1221–1223.

Wang et al., "High–Speed, full field optical coherence microscopy", Proceedings of the SPIE Conference on Coherence Domain Optical Methods in Biomedical Science and Clinical Applications III, San Jose, California, Jan. 1999, pp. 204–212.

Saxer et al., "Fiber–based polarization–sensitive optical coherence tomography", Proceedings of SPIE, vol. 3915, 2000, pp. 68–75.

Park et al., "Burn depth determination by high–speed fiber–based polarization sensitive optical coherence tomography at 1.3 micrometers", Proceedings of SPIE, vol. 3915, 2000, pp. 243–248.

* cited by examiner

FIBER-COUPLED, HIGH-SPEED, ANGLED-DUAL-AXIS OPTICAL COHERENCE SCANNING MICROSCOPES

CROSS-REFERENCE TO RELATED APPLICATIONS

This application is related to the following U.S. patent applications, all of which are herein incorporated by reference: "Fiber-coupled, High-speed, Integrated, Angled-Dual-Axis Confocal Scanning Microscopes Employing Vertical-Section Scanning" of Michael J. Mandella, Mark H. Garrett, and Gordon S. Kino, Ser. No. 09/628,118; and "Fiber-coupled, Angled-Dual-Axis Confocal Scanning Microscopes for Imaging in a Scattering Medium" of Michael J. Mandella, Mark H. Garrett, and Gordon S. Kino, Ser. No. 09/627,363.

FIELD OF THE INVENTION

This invention relates generally to confocal scanning microscopy and optical coherence microscopy. More specifically, it relates to fiber-based optical coherence microscopy systems incorporating a novel, fiber-coupled, angled-dual-axis confocal scanning microscope.

BACKGROUND ART

The advent of fiber optics and laser technology has brought a renewed life to many areas of conventional optics. Confocal microscopes, for example, have enjoyed higher resolution, more integrated structure, and enhanced imaging capability. Consequently, confocal microscopes have become increasingly powerful tools in a variety of applications, including biological and medical imaging, optical data storage and semiconductor applications. The original idea of confocal microscopy traces back to the work of Marvin Minsky. Described in his seminal U.S. Pat. No. 3,013,467 is a system in which an illumination beam passes through a pinhole, traverses a beamsplitter, and is focused by an objective to a focal volume within an object. An observation beam that emanates from the local volume is in turn converged by the same objective lens, reflected by its second encounter with the beamsplitter, and passes through a second pinhole to a photo detector. The geometry of this confocal arrangement is such that only the light beam originating from the focal volume is able to pass through the second pinhole and reach the photo detector, thus effectively discriminating all other out-of-focus signals.

Contemporary confocal microscopes tend to adopt one of two basic confocal geometries. In the transmission arrangement using two objectives, one objective focuses an illumination beam from a point source onto a focal volume within an object and another objective collects an observation beam that emanates from a confocal overlapping volume (within the focal volume). Whereas in the so-called "reciprocal" reflection arrangement, a single objective plays a dual role of focusing light on the object and collecting the light emanated from the object. In either case, the confocal arrangement enables the confocal microscope to attain a higher resolution and sharper definition than a conventional microscope, because out-of-focus signals are rejected. This unique ability has made confocal microscopes particularly useful tools in the examination of biological specimens, since they can view a specific layer within a sample and avoid seeing other layers, the so-called "optical sectioning". Confocal microscopy techniques are also exploited to provide a spatial filter in many applications.

The transmission confocal microscope typically employs two separate lenses: one serves as the illumination objective and the other as the observation objective. The single objective in the "reciprocal" arrangement can also be a single lens, in either simple or compound form. In order to image a thin layer about a few micrometers thick within a sample, however, the numerical aperture (NA) of the objective lenses must be large, so as to provide adequate resolution particularly in the axial direction. This generally results in a short working distance, which is undesirable in practice.

A great deal of ingenuity has accordingly been devoted to improving the axial resolution of confocal microscopes without using high NA lenses. A particularly interesting approach is to spatially arrange two separate illumination and observation objective -lenses, or the illumination and observation beam paths, in such a way that the illumination beam and the observation beam intersect at an angle theta ($\theta$) at the focal points, so that the overall point-spread function for the microscope, i.e., the overlapping volume of the illumination and observation point-spread functions results in a substantial reduction in the axial direction. A confocal microscope with such an angled, dual-axis design is termed a confocal theta microscope, or an angled-dual-axis confocal microscope, hereinafter. The underlying principle as well as the advantages of confocal theta microscopy are described in US Patent Application, "Fiber-coupled, High-speed, Integrated, Angled-Dual-Axis Confocal Scanning Microscopes Employing. Vertical Cross-Section Scanning" of Michael J. Mandella, Mark H. Garrett, and Gordon S. Kino, Ser. No. 09/628,118, filed on Jul. 8, 2000, incorporated herein by reference for all purposes.

More specifically, Ser. No. 09/628,118 discloses an angled-dual-axis confocal scanning microscope comprising an angled-dual-axis confocal scanning head mechanically coupled to a vertical scanning unit. The angled-dual-axis confocal scanning head is configured such that the illumination and observation beams intersect optimally at an angle $\theta$ within an object and the scanning is achieved by pivoting the illumination and observation beams jointly using a single scanning element, thereby producing an arc-line scan. The vertical scanning unit further causes the angled-dual-axis confocal scanning head to move towards or away from the object, whereby a succession of arc-line scans that progressively deepen into the object is produced, providing a two-dimensional vertical cross-section scan of the object. The vertical scanning unit also comprises a compensation means, for keeping the optical path lengths of the illumination and observation beams unchanged so to ensure the optimal intersection of the illumination and observation beams in the course of vertical scanning. This novel scanning mechanism, along with the integrated structure of the angled-dual-axis confocal scanning head and the coupling of optical fibers, enables this angled-dual-axis confocal scanning microscope to perform fast and high resolution scanning over a large transverse field of view, while maintaining a workable working distance. The integration of optical fibers and silicon fabrication technology further renders this angled-dual-axis confocal scanning microscope integrity, flexibility, scalability, and maneuverability, as desired in many applications.

For example, one of the applications the aforementioned angled-dual-axis confocal scanning microscope is particularly suited for is optical coherence microscopy (OCM), which effectively filters out multiple-scattered photon noise, thus providing high sensitivity and large dynamic range of detection when imaging in a scattering medium. Although great stride has been made in improving the sensitivity and imaging capabilities of optical coherence microscopy, as exemplified by U.S. Pat. No. 6,201,608 B1, commonly assigned to the same inventors as the current application, optical coherence microscopy has yet to reach its full potential of high resolution and fast scanning, as required in biological and medical applications, particularly in vivo imaging of live tissue which is constantly in motion. Two of the prior art methods of obtaining high axial resolution in an OCM apparatus involve the use of either a large NA objective lens, or the use of a femto-second pulsed laser with a very short coherence length. These methods are described by Wang et al. in "High Speed, full field optical coherence microscopy", Proceedings of The SPIE Conference on Coherence Domain Optical Methods in Biomedical Science and Clinical Applications III, San Jose, Calif., January 1999, pp. 204–212, and by Drexler et al. in "In vivo ultrahigh-resolution optical coherence tomography", Optics Letters, 21(17), pp. 1221–1223, 1999, all incorporated herein by reference. The primary disadvantage of using a high NA is the limited field of view in which diffraction-limited performance is obtained during high speed transverse scanning. High cost and intricacy of femto-second lasers make the second approach undesirable for a practical instrument.

Hence, there is a need in the art for a new way of applying the techniques of optical coherence microscopy that overcomes the limitations of the prior art methods.

OBJECTS AND ADVANTAGES

Accordingly it is a principal object of the present invention to provide an angled-dual-axis optical coherence scanning microscope that achieves a) high axial resolution;

b) large transverse field of view;

c) long working distance;

d) high-speed vertical cross-section scanning;

e) higher sensitivity and larger dynamic range;

f) improved contrast when imaging in a scattering medium;

g) flexibility and scalability, and h) simple and low cost construction.

These and other objects and advantages will become apparent from the following description and accompanying drawings.

SUMMARY OF THE INVENTION

This invention provides an angled-dual-axis confocal scanning microscope. A first embodiment of the angled-dual-axis confocal scanning microscope of the present invention comprises an angled-dual-axis confocal scanning head and a vertical scanning means. The angled-dual-axis confocal scanning head further comprises a first end of a first single-mode optical fiber serving as a point light source, an angled-dual-axis focusing means, an arc-line scanning means, and a first end of a second single-mode optical fiber serving as a point light detector.

From the first end of the first optical fiber an illumination beam emerges. The angled-dual-axis focusing means serves to focus the illumination beam to a diffraction-limited illumination focal volume along an illumination axis within an object. The angled-dual-axis focusing means further receives an observation beam emanated from an observation focal volume along an observation axis within the object, and focuses the observation beam to the first end of the second optical fiber. The angled-dual-axis focusing means is designed such that the illumination axis and the observation axis intersect at an angle θ within the object, thereby the illumination and observation focal volumes intersect optimally at a confocal overlapping volume. The arc-line scanning means, preferably in the form of a single scanning element such as a silicon micro-machined scanning mirror, is positioned such that it receives the illumination beam from the angled-dual-axis focusing means and directs the illumination beam to the object. The arc-line scanning means also collects the observation beam emanated from the object and passes the observation beam to the angled-dual-axis focusing means. The arc-line scanning means is further capable of pivoting the illumination and observation beams in such a way that the illumination and observation axes remain intersecting at a fixed angle θ and that the confocal overlapping volume moves along an arc-line perpendicular to both the illumination and observation axes within the object, thereby producing an arc-line scan.

The vertical scanning means, in the form of a vertical scanning unit, comprises a vertical translation means and a compensation means. The vertical translation means is mechanically coupled to the angled-dual-axis confocal scanning head, such that it causes the angled-dual-axis confocal scanning head to move towards or away from the object, whereby a succession of arc-line scans that progressively deepen into the object is produced, providing a two-dimensional vertical cross-section scan of the object. The compensation means keeps the optical path lengths of the illumination and observation beams substantially unchanged, so as to ensure the optimal intersection of the illumination and observation focal volumes in the course of vertical scanning. Such a compensation mechanism is also crucial for performing optical coherence microscopy.

Altogether, the first embodiment of the angled-dual-axis confocal scanning microscope of the present invention is designed such that it is capable of performing vertical cross-section scanning in a line-by-line fashion with enhanced axial (i.e., vertical) resolution and greater speed, while maintaining a workable working distance and a large field of view. In applications where a three-dimensional volume image of the object is desired, the object may be further moved incrementally along a transverse direction as each vertical cross-section scan is completed. A plurality of vertical cross-section images thus generated can be assembled into a three-dimensional volume image of a region within the object.

In a second embodiment of the angled-dual-axis confocal scanning microscope of the present invention, an angled-dual-axis confocal head is mechanically coupled to a vertical scanning means and a transverse scanning means. The angled-dual-axis confocal head comprises a first end of a first single-mode optical fiber serving as a point light source, an angled-dual-axis focusing means, and a first end of a second single-mode optical fiber serving as a point light detector.

From the first end of the first optical fiber an illumination beam emerges. The angled-dual-axis focusing means serves to focus the illumination beam to a diffraction-limited illumination focal volume along an illumination axis within an object. The angled-dual-axis focusing means further receives an observation beam emanated from an observation focal volume along an observation axis within the object, and focuses the observation beam to the first end of the second optical fiber. The angled-dual-axis focusing means is designed such that the illumination axis and the observation axis intersect at an angle θ with the object, thereby the illumination and observation focal volumes intersect optimally at a confocal overlapping volume. The vertical scanning means, in the form of a vertical scanning unit, comprises a vertical translation means and a compensation means. The vertical translation means is mechanically coupled to the angled-dual-axis confocal head, such that it causes the angled-dual-axis confocal head to move towards or away from the object, whereby producing a vertical scan that deepens into the interior of the object. The compensation means keeps the optical path lengths of the illumination and observation beams substantially unchanged, thereby ensuring the optimal intersection of the illumination and observation focal volumes in the course of vertical scanning. Moreover, the transverse scanning means, in the form of a transverse stage, serves to translate the object relative to the angled-dual-axis confocal head along transverse directions perpendicular to the vertical direction, thereby providing a transverse scan.

As such, the second embodiment of the angled-dual-axis confocal scanning microscope of the present invention is capable of performing vertical scans and transverse scans in various ways. By assembling an assortment of the vertical and/or transverse scans in a suitable manner, two-dimensional transverse and/or vertical cross-section images of the object can be obtained. A three-dimensional volume image of the object can also be accordingly constructed.

It is to be understood that the term "emanating" as used in this specification is to be construed in a broad sense as covering any light transmitted back from the object, including reflected light and scattered light. It should be also understood that when describing the intersection of the illumination and observation beams in this specification, the term "optimal" means that the illumination and observation focal volumes (i.e., the main lobes of the illumination beam's point-spread function and the observation beam's point-spread function) intersect in such a way that their respective centers substantially coincide and the resulting overlapping volume has comparable transverse and axial extents. This optimal overlapping volume is termed "confocal overlapping volume" in this specification.

In an angled-dual-axis confocal scanning microscope of the present invention, the angled-dual-axis focusing means generally comprises an assembly of beam focusing, collimating, and deflecting elements. Such elements can be selected from the group of refractive lenses, diffractive lenses, GRIN lenses, focusing gratings, micro-lenses, holographic optical elements, binary lenses, curved mirrors, flat mirrors, prisms and the like. A crucial feature of the angled-dual-axis focusing means is that it provides an illumination axis and an observation axis that intersect at an angle θ. The optical fibers can be single-mode fibers, multi-mode fibers, birefrigent fibers, polarization maintaining fibers and the like. Single-mode fibers are preferable in the present invention, for the ends of single-mode fibers provide a nearly point-like light source and detector.

The aforementioned arc-line scanning means typically comprises an element selected from the group consisting of scanning mirrors, reflectors, acousto-optic deflectors, electro-optic deflectors, mechanical scanning mechanisms, and Micro-Electro-Mechanical-Systems (MEMS) scanning micro-mirrors. A preferred choice for the arc-line scanning means is a flat pivoting mirror, particularly a silicon micro-machined scanning mirror for its compact and light-weight construction. Moreover, the arc-line scanning means is placed between the angled-dual-axis focusing means and the object to be examined. This enables the best on-axis illumination and observation point-spread functions to be utilized throughout the entire angular range of an arc-line scan, thereby providing greater resolution over a larger transverse field of view, while maintaining diffraction-limited performance. Such an arrangement is made possible by taking advantage of the longer working distance rendered by using relatively lower NA focusing elements or lenses in the angled-dual-axis focusing means.

A distinct advantage of the angled-dual-axis confocal scanning microscope of the present invention is that the scanning is achieved by pivoting both the illumination and observation beams, as opposed to moving either the object or the microscope's objective lenses in the prior art confocal theta scanning microscopes, which can be quite cumbersome to implement and adversely limits the precision of scanning.

Another important advantage of the angled-dual-axis arrangement of the present invention is that since the observation beam is positioned at an angle relative to the illumination beam, scattered light along the illumination beam does not easily get passed into the observation beam, except where the beams overlap. This substantially reduces scattered photon noise in the observation beam, thus enhancing the sensitivity and dynamic range of detection. This is in contrast to the direct coupling of scattered photon noise between the illumination and observation beams in a transmission or reciprocal confocal microscope, due to the collinear arrangement between the beams. Moreover, by using low NA focusing elements (or lenses) in an angled-dual-axis confocal scanning system of the present invention, the illumination and observation beams do not become overlapping until very close to the focus. Such an arrangement prevents additional scattered light in the illumination beam from directly "jumping" to the observation beam, hence further filtering out multiple-scattered photon noise in the observation beam. Unfortunately, this arrangement does not eliminate multiple-scattered photon noise that originates within the observation beam. The present invention employs a temporal gating technique, to filter out this source of noise. Altogether, the angled-dual-axis confocal scanning system of the present invention has much lower noise and is capable of providing much higher contrast when imaging in a highly scattering medium than the prior art confocal systems.

A further advantage of the present invention is that the entire angled-dual-axis confocal scanning head in the first embodiment, or the angled-dual-axis confocal head in the second embodiment, can be mounted on a silicon substrate etched with precision V-grooves which host various optical elements. Such an integrated device offers a high degree of integrity, maneuverability, scalability, and versatility, while maintaining a workable working distance and a large field of view. In particular, a micro-optic version of an integrated, angled-dual-axis confocal scanning head (or angled-dual-axis confocal head) of the present invention can be very useful in biological and medical imaging applications, e.g., endoscopes and hand-held optical biopsy instruments.

All in all, the angled-dual-axis contocal scanning microscope of the present invention provides high resolution scanning with greater precision and faster speed, while maintaining a workable working distance and a large field of view. The angled-dual-axis confocal scanning microscope of the present invention further advantageously exploits the flexibility, scalability and integrity afforded by optical fibers and silicon micro-machining techniques, rendering it a highly versatile and modular device.

The present invention provides an angled-dual-axis optical coherence scanning microscope incorporating the aforementioned angled-dual-axis confocal scanning microscope. An exemplary embodiment of the angled-dual-axis optical coherence scanning microscope of the present invention comprises an angled-dual-axis confocal scanning microscope as described above (e.g., in its first or second exemplary embodiment), a light source, a beam-splitting means, a reference optical fiber, and a beam-combining means. The beam-splitting means is in optical communication with the light source and the angled-dual-axis confocal scanning microscope, such that it diverts a portion of an output beam emitted from the light source to the first optical fiber of the angled-dual-axis confocal scanning microscope and a remainder of the output beam to the reference optical fiber, thereby creating an illumination beam and a reference beam from the same parent beam. An observation beam collected by the angled-dual-axis confocal scanning microscope is delivered by way of the second optical fiber of the angled-dual-axis confocal scanning microscope, and is further combined with the reference beam at the beam-combining means to generate coherent interference.

In the embodiment described above, the beam-combining means can be in the form of a fiber-optic coupler, at which the reference and second optical fibers are joined and the reference and observation beams are combined. Balanced detection scheme can be accordingly utilized. The system may further comprise a frequency shifting means optically coupled to the first or second optical fiber of the angled-dual-axis confocal scanning microscope, such that the frequency of the observation beam is shifted relative to the frequency of the reference beam. Alternatively, the frequency shifting means can be optically coupled to the reference optical fiber, such that the frequency of the reference beam is shifted relative to the frequency of the observation beam. In either case, coherent interference between the reference and observation beams is modulated at a heterodyne beat frequency given by the relative frequency shift between the reference and observation beams, allowing for more sensitive heterodyne detection. Moreover, an adjustable optical delay device may be coupled to the reference optical fiber, the first or second optical fiber, so as to maintain coherent interference between the reference and observation beams at the fiber-optic coupler where they are combined. In applications where the light source has a short coherence length, the optical delay device can be adjusted such that mostly single-scattered light in the observation beam is coherent with the reference beam at the fiber-optic coupler and multiple-scattered light in the observation beam, which traverses over a longer optical path length, does not contribute to the coherent interference, therefore providing further filtering of multiple-scattered light upon detection. To enhance the signal-to-noise ratio of detection, an optical amplifier can be coupled to the second optical fiber, so as to boost up the power of the observation beam returning from the object. An amplified observation beam has an additional advantage of rendering faster scanning rates and consequently higher pixel rates without appreciable loss in the signal-to-noise ratio, because a shorter integration time per pixel of an image is required in data collection. The implementation of balanced detection in this case allows subtraction of the amplifier noise, since preponderance of the spontaneous emission of the optical amplifier would not occur at the heterodyne beat frequency described above.

The light source in the above embodiment can be an optical fiber amplifier, semiconductor optical amplifier, a fiber laser, a semiconductor laser, a diode-pumped solid state laser, or a broadband OCT light source. The light source may be polarized, or unpolarized. The beam-splitting means can be a fiber-optic coupler, such as an evanescent wave coupler or a fused fiber coupler. Various optical fibers, such as the first, second, and reference optical fibers, are preferably single-mode fibers, for single-mode fibers have the advantage of simplicity and automatic assurance of the mutual spatial coherence of the observation and reference beams upon mixing and detection.

In one case where polarized light is provided by the light source and the beam-splitting means is a polarizing beamsplitter, the orientation of the beamsplitter relative to the polarization of light emitted from the light source can be used to control the ratio of optical power between the illumination and reference beams. Furthermore, the first, second, and reference optical fibers are preferably polarization maintaining (PM) fibers, to control the polarizations of the illumination, observation and reference beams throughout the entire system. The optical coupling between the polarized light source and the polarizing beamsplitter is also preferably by way of a third PM fiber. In this case, the reference and observation beams can be brought into the same polarization by rotating either the reference or second optical fiber before joining them at the fiber-optic coupler. Alternatively, a polarization rotation means, such as a Faraday rotator, can be coupled to either the reference optical fiber or the second optical fiber, such that the reference and observation beams have substantially the same polarization when combined.

The aforementioned embodiment can also be used to provide specific information pertaining to the polarization state of light emanated from a polarization-altering, such as a birefrigent-scattering, medium. Many biological tissues, such as tendons, muscle, nerve, bone, cartilage and teeth, exhibit birefrigence due to their linear or fibrous structure. Birefrigence causes the polarization state of light to be altered (e.g., rotated) in a prescribed manner upon refection. Thus, by detecting induced changes in the polarization state of light reflected from a birefrigent-scattering medium, image representing birefrigent (or other polarization-altering) "scatterers" can be obtained. In such a case, the polarizing beamsplitter produces an illumination beam with P-polarization and a reference beam with orthogonal S-polarization from a polarized beam emitted from the light source. An observation beam reflected from a birefirgent-scattering (or polarization-altering) sample carries both P-polarization and S-polarization, where the presence of S-polarization is resulted from the birefrigent (or other polarization-altering) "scatterers" in the sample. When the reference and observation beams are combined at the fiber-optic coupler, only the observation beam with S-polarization interferes coherently with the reference beam that has only S-polarization. Consequently, the amplitude of resulting heterodyne beat frequency signal corresponds only to the amplitude of reflectance of light with S-polarization, hence providing an image representing birefrigent (or other polarization-altering) "scatterers" in the sample.

In applications where the observation beam with P-polarization is of greater interest, a polarization rotation means, such as a rotatable fiber connector or a Faraday rotator, can be coupled to the reference PM fiber in the above embodiment, such that the polarization of the reference beam is rotated by 90-degree, resulting a reference beam with P-polarization. Upon combining the reference and observation beams in this case, only the observation beam with P-polarization interferes coherently with the reference beam that now has only P-polarization. Consequently, the amplitude of resulting heterodyne beat frequency signal measures only the amplitude of reflectance of light with P-polarization.

Moreover, in applications where both P-polarization and S-polarization of the observation beam are of interest, a first auxiliary polarizing beamsplitter can be optically coupled to the second PM fiber of the angled-dual-axis confocal scanning microscope, serving to separate P-polarization and S-polarization of the observation beam by routing them to fourth and fifth PM fibers, respectively. A polarization rotation means, such as a rotatable fiber connector or a Faraday rotator, can be optically coupled to the reference PM fiber and serves to rotate the polarization of the reference beam by 45-degree, thus rendering the reference beam with both P-polarization and S-polarization. The polarization-rotated reference beam is then delivered to a second auxiliary polarizing beamsplitter, which in turn separates P-polarization and S-polarization of the reference beam by routing them to sixth and seventh PM fibers, respectively. The system may further comprise a frequency shifting means optically coupled to the first or second PM fiber, such that the frequency of the observation beam is shifted relative to the reference beam. The fourth and sixth PM fibers can be further joined by a first auxiliary fiber-optic coupler, where the observation and reference beams with S-polarization are coherently combined and the amplitude of resulting heterodyne beat frequency signal corresponds to the amplitude of reflectance of light with S-polarization. Similarly, the fifth and seventh PM fibers can be joined by a second auxiliary fiber-optic coupler, at which the observation and reference beams with P-polarization are coherently combined and the amplitude of resulting heterodyne beat frequency signal measures the amplitude of reflectance of light with P-polarization. As such, the exemplary system thus described can be utilized to provide an image pertaining to the birefrigent-scattering (or other polarization-altering) regions in a sample with enhanced contrast.

It should be noted that in the above exemplary cases involving polarized light, a polarization maintaining fiber-optic coupler can be alternatively used with the polarized light source. A polarization rotation means may be optically coupled to the reference PM fiber for rotating the polarization of the reference beam, so as to select the desired polarization of the observation beam. Moreover, an unpolarized light source along with a polarizing beamsplitter can be used to provide a polarized illumination beam and a polarized reference beam with orthogonal polarization. A disadvantage of using an unpolarized light source is, however, that the ratio of optical power between the illumination and reference beams cannot be efficiently adjusted to best suit a particular application.

The present invention further provides an alternative embodiment of an angled-dual-axis optical coherence microscope, comprising a light source equipped with dual output-ports, an angled-dual-axis confocal scanning microscope as previously described, and a reference optical fiber. A first output-port of the light source is optically coupled to the first optical fiber of the angled-dual-axis confocal scanning microscope, transmitting an illumination beam. A second output-port of the light source is optically coupled to the reference optical fiber, providing a reference beam. An observation beam collected by the angled-dual-axis confocal scanning microscope is delivered by way of the second optical fiber, and is in turn combined with the reference beam such that coherent interference is produced for detection.

In the aforementioned embodiment, the reference and second optical fibers may be joined by a fiber-optic coupler, to provide for a balanced detection scheme. The system further comprises a frequency shifting means optically coupled to the first or second optical fiber of the angled-dual-axis confocal scanning microscope, such that the frequency of the observation beam is shifted relative to the frequency of the reference beam. Alternatively, the frequency shifting means can be optically coupled to the reference optical fiber, such that the frequency of the reference beam is shifted relative to the frequency of the observation beam. In either case, coherent interference between the reference and observation beams is modulated at a beat frequency, such that heterodyne balanced detection can be utilized. Moreover, an adjustable optical delay device may be coupled to either the reference optical fiber, or the second optical fiber, to maintain coherent interference between the reference and observation beams at the fiber-optic coupler where they are combined. To enhance the signal-to-noise ratio of detection, an optical amplifier can be coupled to the second optical fiber, so as to boost up the power of the observation beam.

The light source in the above embodiment is preferably a short coherence length source, such as the type commonly used for optical coherence tomography applications. The light source can also be an optical fiber amplifier, a semiconductor optical amplifier, a fiber laser, a semiconductor laser, or a diode-pumped solid state laser, equipped with dual output-ports. Various optical fibers, such as the first, second, and reference optical fibers, are preferably single-mode fibers, for single-mode fibers have the advantage of simplicity and automatic assurance of the mutual spatial coherence of the observation and reference beams upon mixing and detection. If polarized light is provided by the light source, the first, second, and reference optical fibers are preferably polarization maintaining fibers. To ensure that the reference and observation beams have the same polarization upon detection, either the reference or second optical fiber can be rotated by an appropriate amount before they are joined at the fiber-optic coupler.

The angled-dual-axis optical coherence microscope of the present invention, as the above exemplary embodiments demonstrate, offers the advantages of enhanced axial resolution while maintaining a workable working distance, fast and high-precision scanning over a large field of view, while attaining higher sensitivity and larger dynamic range of detection provided by the optical coherence technique. It also advantageously exploits the flexibility, scalability, ruggedness, and low cost afforded by optical fibers. As such, the angled-dual-axis optical coherence microscope of the present invention is particularly suited for applications in which high resolution, high contrast imaging and fast scanning are required, such as in vivo imaging of live tissue for performing optical biopsies in many medical applications.

The novel features of this invention, as well as the invention itself, will be best understood from the following drawings and detailed description.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiment of the invention described below is set forth without any loss of generality to, and without imposing limitations upon, the claimed invention.

Figure 1A:
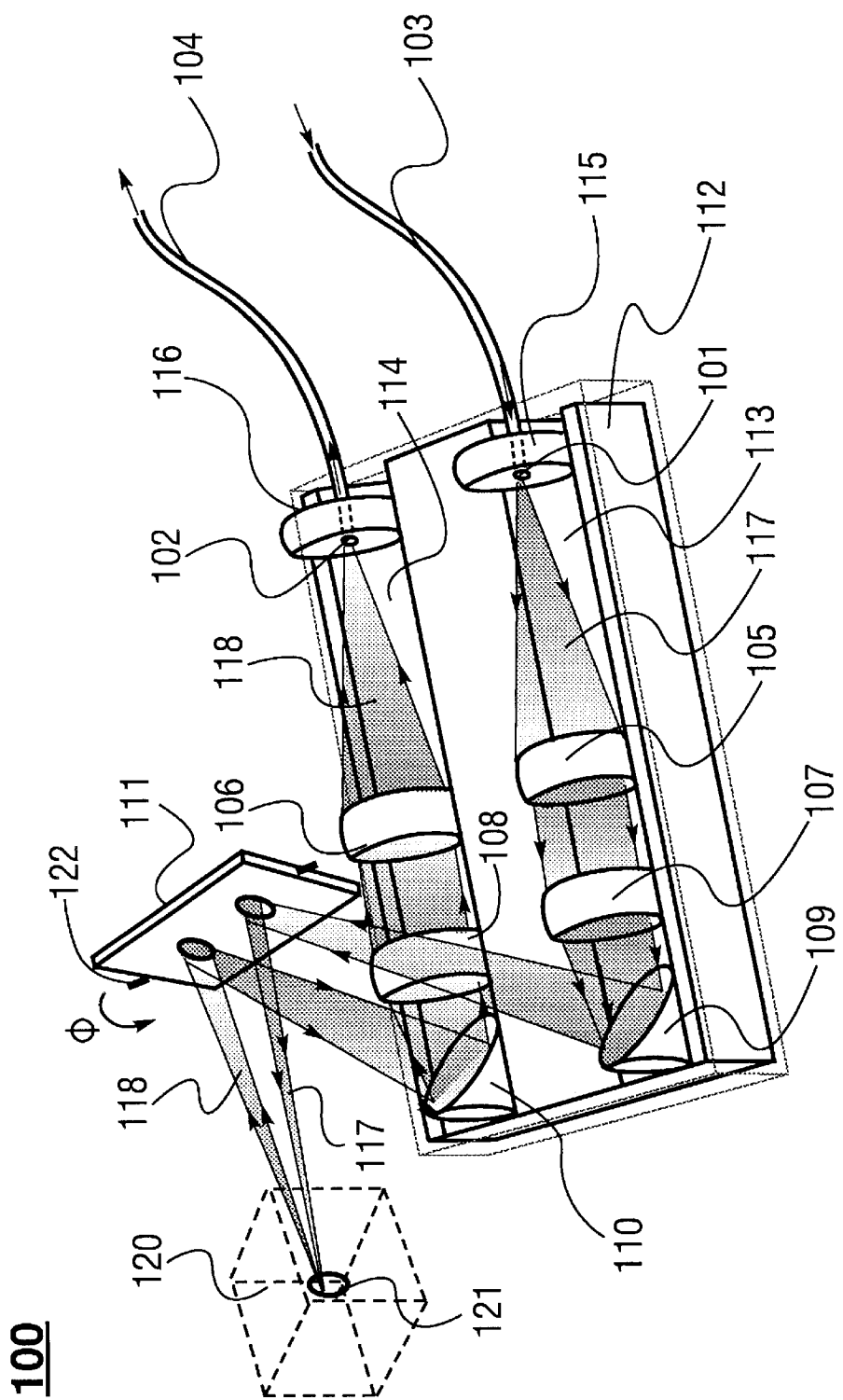
FIGS. 1A–1D shows several exemplary embodiments of an angled-dual-axis confocal scanning head according to the present invention.

FIGS. 1A–1D depict several exemplary embodiments of an angled-dual-axis confocal scanning head according to the present invention. Depicted in FIG. 1A is a first exemplary embodiment of an angled-dual-axis confocal scanning head of the present invention. Confocal scanning head 100, by way of example, comprises a first end 101 of a first optical fiber 103 serving as a point light source; a first end 102 of a second optical fiber 104 serving as a point light detector; an angled-dual-axis focusing means in the form of a lens assembly consisting of first collimating lens 105, second collimating lens 106, illumination lens 107, observation lens 108, and two beam-aligning elements in the form of first 45-degree mirror 109 and second 45-degree mirror 110; an arc-line scanning means in the form of a single scanning mirror 111, which can be pivoted about axis 122, and a silicon substrate 112. First collimating lens 105, illumination lens 107, and first mirror 109 are mounted on first V-groove 113 etched on substrate 112. Similarly, second collimating lens 106, observation lens 108, and second mirror 110 are mounted on second V-groove 114 etched on substrate 112. First optical fiber 103 and second optical fiber 104 are affixed to cylindrical ferrules 115 and 116 respectively, which are in turn mounted on V-grooves 113 and 114 respectively, such that fiber ends 101 and 102 are held in their respective positions.

In operation, an illumination beam 117 emerges from first end 101 of first optical fiber 103 and is directed to first collimating lens 105. The collimated beam is then passed onto and focused by illumination lens 107. The focused beam is further deflected by first mirror 109 to scanning mirror 111, which in turn directs the beam to a diffraction-limited illumination focal volume (see FIG. 1B) within an object 120.

An observation beam 118 emanated from a diffraction-limited, confocal overlapping volume 121 is first collected by scanning mirror 111, then directed to second mirror 110, which in turn deflects the beam to observation lens 108. Observation beam 118 is further collimated by observation lens 108 and then focused by second collimating lens 106 to first end 102 of second optical fiber 104. Scanning mirror 111 is positioned such that illumination beam 117 and observation beam 118 intersect optimally at an angle ($\theta$) within object 120.

Figure 1B:
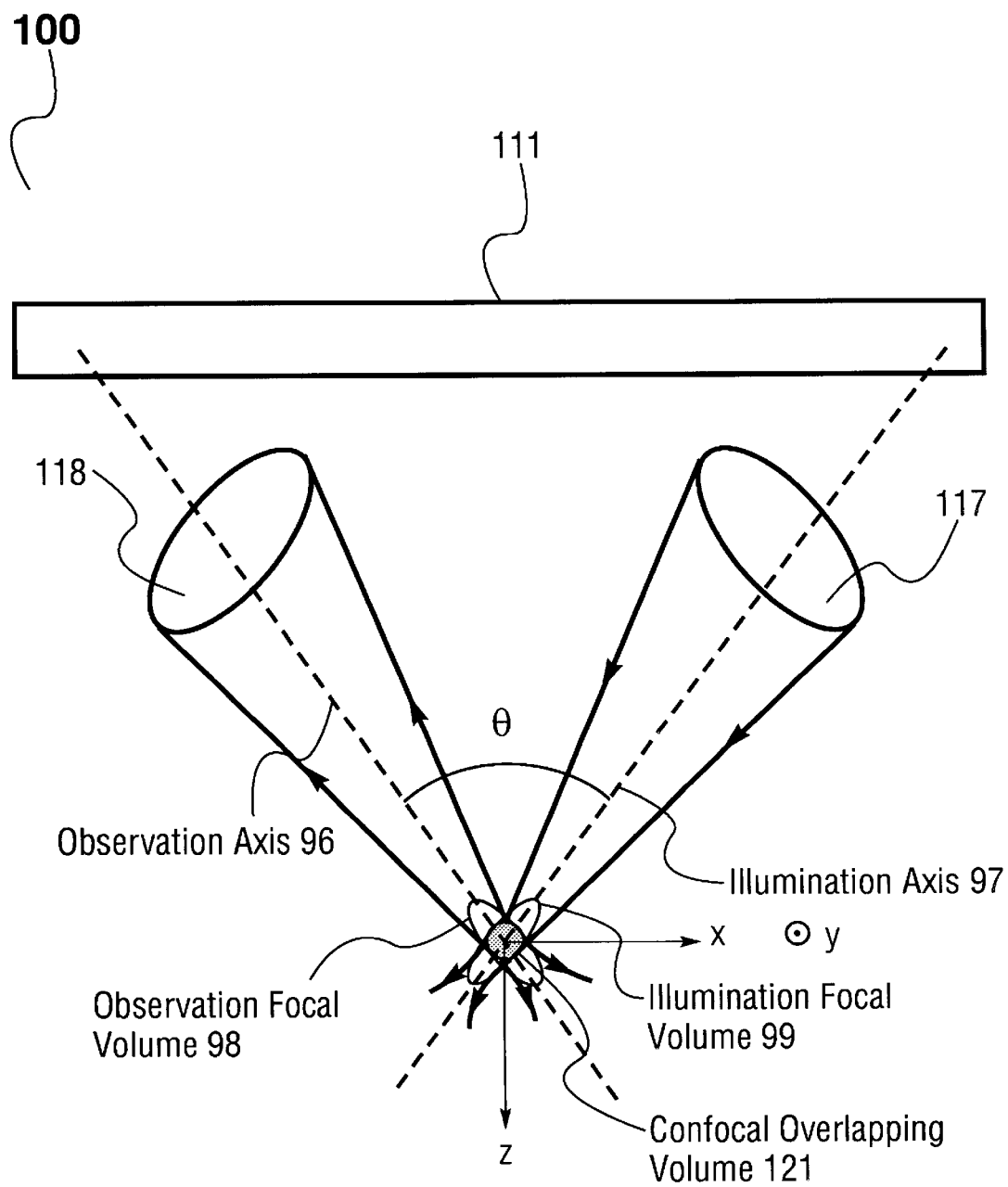

FIG. 1B provides a more detailed illustration of how illumination beam 117 and observation beam 118 are arranged to intersect within object 120 in FIG. 1A. Illumination beam 117, directed by scanning mirror 111, is focused to an illumination focal volume 99 oriented along an illumination axis 97 within object 120. Observation beam 118 emanates from an observation focal volume 98 oriented along an observation axis 96 within object 120 is received by scanning mirror 111. Illumination axis 97 and observation axis 96 are directed to intersect at angle $\theta$, such that illumination focal volume 99 and observation focal volume 98 intersect optimally at confocal overlapping volume 121. A three-dimensional x-y-z coordinate system is provided to describe the spatial extents of confocal overlapping volume 121, where the origin of the coordinate system is set at the center of confocal overlapping volume 121. The z-axis defines the axial (or vertical) direction, whereas x-axis and y-axis (pointing out of the page) represent two orthogonal transverse directions.

It is to be understood that the term "emanating" as used in this specification is to be construed in a broad sense as covering any light transmitted back from the object, including reflected light and scattered light.

In the present invention, various optical elements are aberration-corrected, and single-mode optical fibers are used to provide a point light source and detector. Accordingly, illumination focal volume 99 and observation focal volume 98 described above are diffraction-limited, defined by the main lobes of the illumination beam's point-spread function and observation beam's point-spread function. Confocal overlapping volume 121 is likewise diffraction-limited, determined by an optimal overlapping of the main lobes of the illumination beam's point-spread function and the observation beam's point-spread function, as illustrated in FIG. 1B.

Ser. No. 09/628,118, incorporated herein by reference, discloses a mathematical model for calculating the point-spread functions of two optimally intersecting focused beams, such as illumination beam 117 and observation beam 118 exemplified in FIG. 1B, thereby providing an estimate of the three-dimensional extents of the resulting confocal overlapping volume, e.g., confocal overlapping volume 121. As the exemplary model calculations and accompanying graphs in Ser. No. 09/628,118 indicate, the confocal overlapping volume displays Gaussian-like characteristics in x, y, and z directions, diminishing rapidly and monotonically (i.e., there are no additional side-bands) with increasing distance from the center of the two-beam overlapping region. Such characteristics define a sharp resolution in both the axial as well as transverse directions. As a way of example, for an angled-dual-axis confocal system with an intersecting angle $\theta$ (=$2\alpha$) equal to 60° and NA of the objective lenses about 0.25, the corresponding axial resolution is approximately 2.8 microns, and the transverse resolutions about 1.6 and 1.4 microns, respectively.

Now referring back to FIG. 1A, by rotating about axis 122 at a variable angle $\phi$, scanning mirror 111 is further capable of pivoting illumination beam 117 and observation beam 118 jointly in such a way that illumination beam 117 and observation beam 118 remain intersecting optimally at angle $\theta$ and confocal overlapping volume 121 at the intersection of the two beams moves along an arc-line within object 120, thereby producing an arc-line scan.

It should be noted that an important characteristic of the arc-line scan described above is that the relative spatial orientation between illumination beam 117 and observation beam 118 stays fixed in the course of the entire scan, once the two beams are arranged to intersect in an optimal manner initially. This is in distinct contrast to the prior art confocal theta scanning systems, where the illumination and observation beams need to be separately adjusted at each scan point, in order to ensure an optimal intersection. Consequently, the scans performed by angled-dual-axis confocal scanning head 100 of the present invention are inherently of higher precision and faster speed, and are also less laborious to carry out. Another notable feature of angled-dual-axis confocal scanning head 100 of the present invention is that the illumination and observation beam paths can be exchanged, without affecting its performance.

Figure 1C:
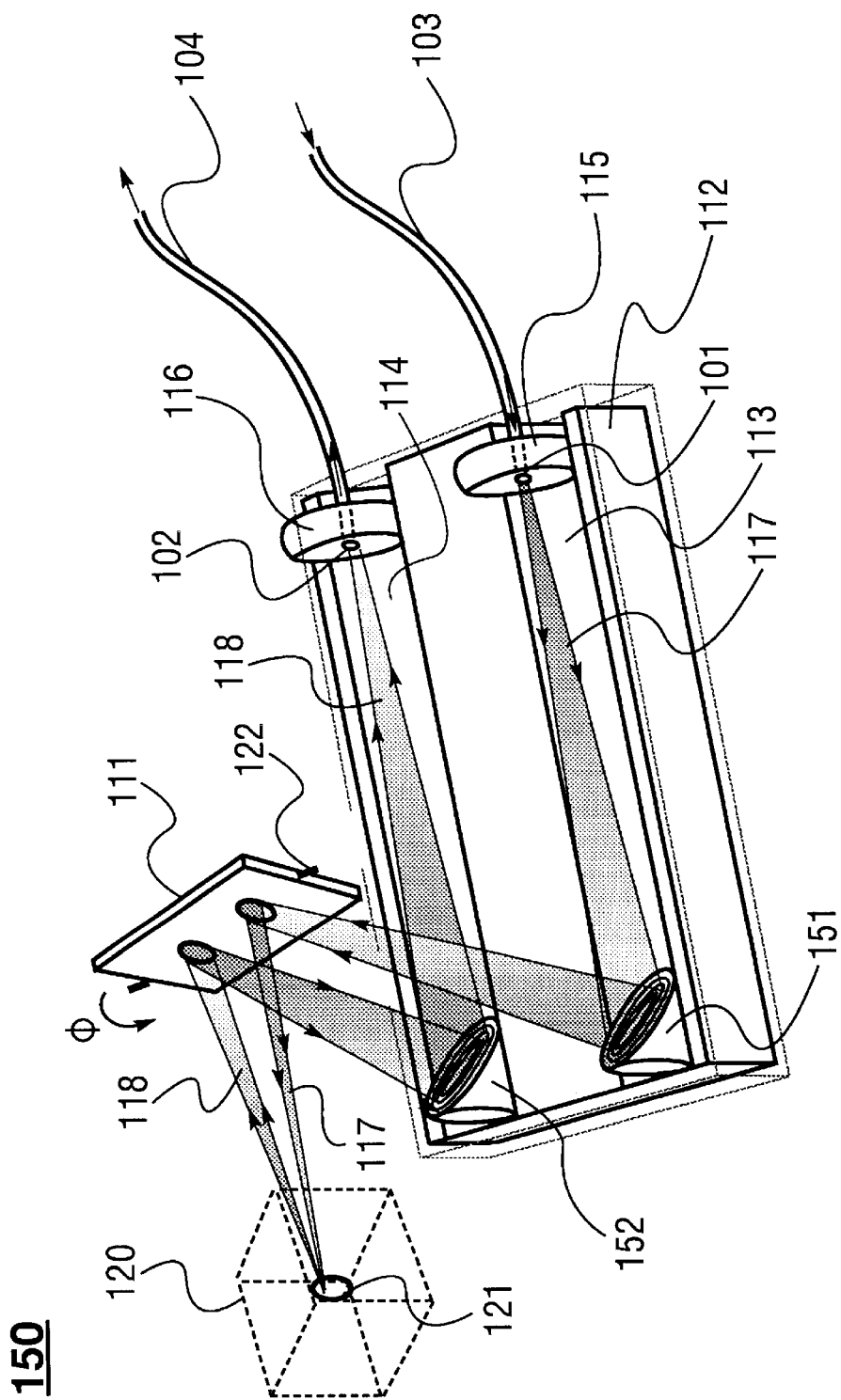

FIG. 1C shows a second exemplary embodiment of an angled-dual-axis confocal scanning head of the present invention. In angled-dual-axis confocal scanning head 150, an illumination reflective focusing element 151 is implemented to replace first collimating lens 105, illumination lens 107, and first mirror 109 in FIG. 1A, providing a dual function of focusing and deflecting illumination beam 117. Likewise, an observation reflective focusing element 152 is used to replace second mirror 110, observation lens 108, and second collimating lens 106 in FIG. 1A, providing a dual function of focusing and deflecting observation beam 118. The remainder of angled-dual-axis confocal scanning head 150 shares the same components with angled-dual-axis confocal scanning head 100 in FIG. 1A. By way of example, illumination and observation reflective focusing elements 151, 152 are in the form of two diffractive lenses with reflective coatings. The proper design of such reflective diffraction lenses can be determined by commercially available computer modeling programs and is well known in the art of diffractive lens design. Illumination and observation reflective focusing elements 151, 152 can alternatively be in the form of curved mirrors. In some cases of using curved mirrors such as ellipsoidal mirrors (each having two foci), it is desirable to place fiber ends 101, 102 at the respective first focal points of the two ellipsoidal mirrors serving as illumination and observation focusing elements 151, 152, thereby focusing illumination beam 117 and observation beam 118 at the respective second focal points of focusing elements 151, 152. All in all, the overall operation of angled-dual-axis confocal scanning head 150 is similar to the working of angled-dual-axis confocal scanning head 100, as described above.

Figure 1D:
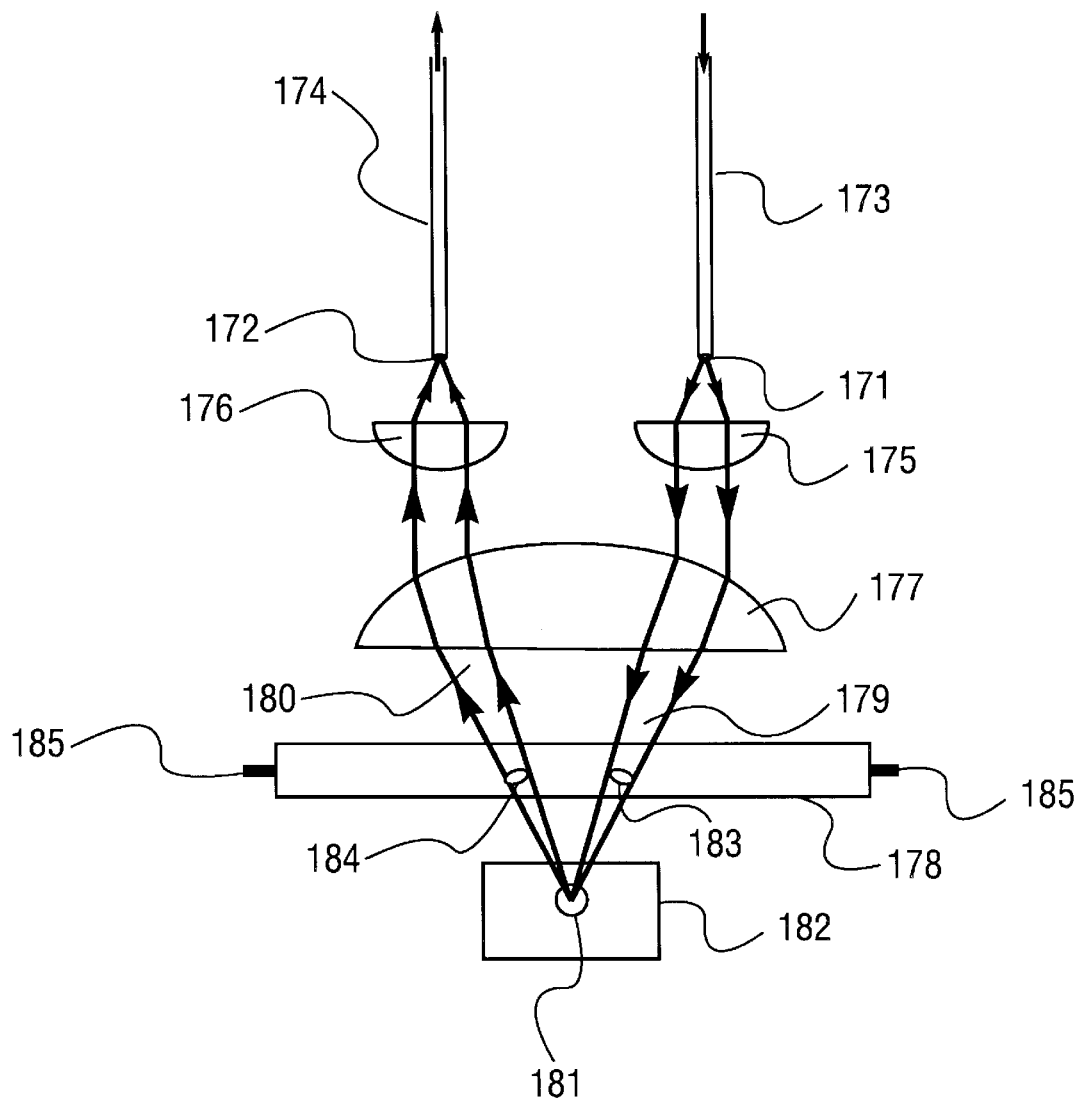

FIG. 1D depicts a simplified schematic illustration of a third exemplary embodiment of an angled-dual-axis confocal scanning head of the present invention. Angled-dual-axis confocal scanning head 170 comprises a first end 171 of a first optical fiber 173 serving as a point light source; a first end 172 of a second optical fiber 174 serving as a point light detector; an angled-dual-axis focusing means in the form of a lens assembly consisting of first collimating lens 175, second collimating lens 176, and illumination-observation lens 177; and an arc-line scanning means in the form of a single scanning mirror 178 having a pivoting axis 185.

In operation, an illumination beam 179 emerges from first end 171 of first optical fiber 173 and is directed to first collimating lens 175. The collimated beam is then passed onto and focused by illumination-observation lens 177. The focused beam reflects off scanning mirror 178 at first impingement spot 183, and is further directed to a diffraction-limited illumination focal volume (not shown in FIG. 1D) within an object 182. An observation beam 180 emanated from a diffraction-limited, confocal overlapping volume 181 is first received by scanning mirror 178 at second impingement spot 184, further passed onto and collimated by illumination-observation lens 177. Observation beam 180 is then focused by second collimating lens 176 to first end 172 of second optical fiber 174. Scanning mirror 178 is positioned such that illumination beam 179 and observation beam 180 intersect optimally at an angle (θ) within confocal overlapping volume 181, as illustrated in FIG. 1B. By rotating about axis 185, scanning mirror 178 is further capable of pivoting illumination beam 179 and observation beam 180 jointly in such a way that illumination beam 179 and observation beam 180 remain intersecting optimally at angle θ and confocal overlapping volume 181 at the intersection of the two beams moves along an arc-line within object 120, thereby producing an arc-line scan, as in the embodiment of FIG. 1A or FIG. 1C.

It should be noted that in an angled-dual-axis arrangement of the present invention, as the above exemplary embodiments depict, since the observation beam is positioned at an angle relative to the illumination beam, scattered light along the illumination beam does not easily get passed into the observation beam, except where the beams overlap. This substantially reduces scattered photon noise in the observation beam, thus enhancing the sensitivity and dynamic range of detection. This is in contrast to the direct coupling of scattered photon noise between the illumination and observation beams in a transmission or reciprocal confocal microscope, due to the coilinear arrangement between the beams. Moreover, by using low NA focusing elements (or lenses) in an angled-dual-axis confocal scanning system of the present invention, the illumination and observation beams do not become overlapping until very close to the focus. Such an arrangement prevents additional scattered light in the illumination beam from directly "jumping" to the observation beam, hence further filtering out multiple-scattered photon noise in the observation beam. Unfortunately, this arrangement does not eliminate multiple-scattered photon noise that originates within the observation beam. The present invention employs a temporal gating technique, to filter out this source of noise. Altogether, the angled-dual-axis confocal scanning system of the present invention has much lower noise and is capable of providing much higher contrast when imaging in a highly scattering medium than the prior art confocal systems.

FIGS. 1A, 1C–1D serve to illustrate only three of many embodiments of an angled-dual-axis confocal scanning head of the present invention. In general, the angled-dual-axis focusing means in an angled-dual-axis confocal scanning head of the present invention comprises an assembly of one or more elements for beam focusing, collimating, aligning, and deflecting, as exemplified in FIGS. 1A, 1C–1D. Such elements can be in the form of refractive lenses, diffractive lenses, GRIN lenses, focusing gratings, micro-lenses, holographic optical elements, binary lenses, curved mirrors, flat mirrors, prisms and the like. A crucial feature of the angled-dual-axis focusing means is that it provides an illumination axis and an observation axis that intersect at an angle, as illustrated in FIG. 1B. The arc-line scanning means in an angled-dual-axis confocal scanning head of the present invention generally comprises an element selected from the group consisting of scanning mirrors, reflectors, acousto-optic deflectors, electro-optic deflectors, mechanical scanning mechanisms, and Micro-Electro-Mechanical-Systems (MEMS) scanning micro-mirrors. A key feature is that the arc-line scanning means is in the form of a single element, as opposed to two or more separately functioning scanning elements in prior art confocal scanning systems. A preferred choice for the arc-line scanning means is a flat pivoting mirror, particularly a silicon micro-machined scanning mirror for its compact and light-weight construction. (Note: to achieve faster scanning, the scanning means can be in the form of two smaller coplanar pivoting mirrors, such as two silicon micro-machined scanning mirrors. Owing to their unique fabrication process, these mirrors can be operated in substantially synchronous motion and constructed to co-rotate about a common axis so as to scan illumination and observation beams in a way functionally equivalent to a larger single scanning mirror.) The fabrication processes of silicon scanning mirrors are described in U.S. Pat. Nos. 6,007,208, 6,057,952, 5,872,880, 6,044,705, 5,648,618, 5,969,465, and 5,629,790. The optical fibers in an angled-dual-axis confocal scanning head of the present invention can be single-mode fibers, multi-mode fibers, birefrigent fibers, polarization maintaining fibers and the like. Single-mode fibers are preferable, however, for the ends of single-mode fibers provide a nearly point-like light source and detector.

A unique feature of the angled-dual-axis confocal scanning head of the present invention is that the arc-line scanning means is placed between the angled-dual-axis focusing means and the object to be examined. This enables the best on-axis illumination and observation point-spread functions to be utilized throughout the entire angular range of an arc-line scan, thereby providing greater resolution over a larger transverse field of view, while maintaining diffraction-limited performance. Such an arrangement is made possible by taking advantage of the longer working distance rendered by using relatively lower NA focusing elements or lenses in the angled-dual-axis focusing means. For example, in the present invention, molded a spherical lenses with NA ranging from 0.1 to 0.4 that are low cost and readily available in the art may be used. Such lenses have excellent on-axis aberration correction, and are therefore diffraction-limited for on-axis focusing conditions. These lenses normally do not have diffraction-limited performance when focusing off-axis, and thus cannot be used in confocal scanning systems where off-axis performance is important. Such is the case in prior art confocal scanning systems described in U.S. Pat. Nos. 5,973,828 and 6,064,518, where the field of view is limited by the off-axis performance of the objective lenses.

Moreover, the specific arrangements among various optical elements and optical fibers in an angled-dual-axis confocal scanning head can be altered in many ways without deviating from the principle and the scope of the present invention. For instance, the use of collimating lenses and beam-aligning mirrors, such as those in FIG. 1A to help facilitate the shaping and alignment of the illumination and observation beams, can be optional and vary with the nature of practical applications. Other auxiliary optical elements may also be implemented in an angled-dual-axis confocal scanning head of the present invention, to enhance the overall performance. All in all, a skilled artisan will know how to design an angled-dual-axis confocal scanning head in accordance with the principle of the present invention, to best suit a given application.

By integrating its constituent optical elements on a silicon substrate, as exemplified in FIGS. 1A, 1C by way of silicon fabrication techniques, the angled-dual-axis confocal scanning head of the present invention renders a high degree of integrity, maneuverability, scalability, and versatility.

Such a design also provides greater flexibility and higher precision in the alignment of various optical elements. Although the particular way of making an angled-dual-axis confocal scanning head of the present invention an integrated device is dictated by the nature of a given application, a silicon substrate is generally preferred, for it is well known in the art that various V-grooves can be etched on silicon in a very precise manner, as demonstrated in U.S. Pat. Nos. 6,007,208 and 5,872,880. The precision of the V-grooves provides an accurate and secure optical alignment among various optical elements hosted by these V-grooves, enabling the angled-dual-axis confocal scanning head thus constructed to be a reliable and modular device. Using the embodiment of FIG. 1A as a way of example, mirrors 109, 110 can be rotated about their respective axes and translated along V-grooves 113, 114 respectively, to facilitate the optimal intersection of illumination and observation beams 117, 118. Illumination and observation lenses 107, 108 can also be translated along V-grooves 113, 114 respectively, to further facilitate the optimal overlapping of illumination and observation focal volumes 99, 98 as illustrated in FIG. 1B. Such alignment procedures can be performed before affixing (e.g., by means of gluing) various optical elements to their respective V-grooves. The scalability and relatively low cost of silicon fabrication technology add further advantages to this approach. For example, a micro-optic version of such an integrated angled-dual-axis confocal scanning head can be incorporated in miniature surgical devices, endoscopes, or other in situ devices, suitable for medical applications.

Figure 2A:
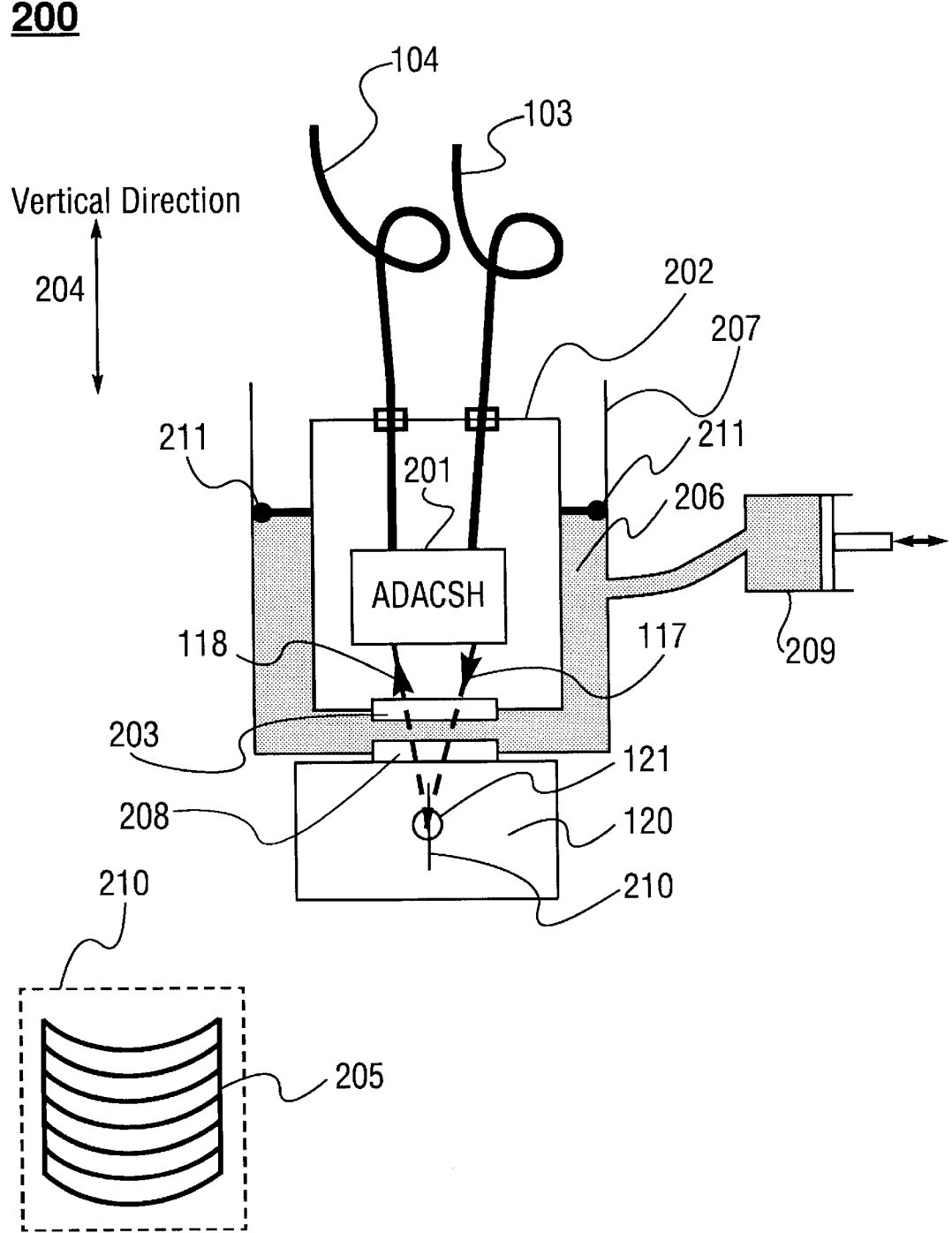
FIGS. 2A–2C depict three exemplary embodiments of an angled-dual-axis confocal scanning microscope according to the present invention.

To provide a two-dimensional scan, an angled-dual-axis confocal scanning head of the present invention can be mechanically coupled to a vertical scanning means in the form of a vertical scanning unit comprising a vertical translation means and a compensation means. The vertical translation means causes the angled-dual-axis confocal scanning head to move toward or away from the object and hence the illumination and observation beams to probe further into the interior of the object, thereby producing a vertical scan. A two-dimensional vertical cross-section scan of the object is then obtained by assembling a plurality of arc-line scans that progressively deepen into the object. The compensation means keeps the optical path lengths of the illumination and observation beams substantially unchanged, thereby ensuring the optimal intersection of the illumination and observation focal volumes in the course of vertical scanning. This compensation function is also crucial for performing optical coherence microscopy. The combination of the angled-dual-axis confocal scanning head and the vertical scanning unit thus described constitutes a first embodiment of an angled-dual-axis confocal scanning microscope, as depicted in FIG. 2A. Angled-dual-axis confocal scanning microscope 200, by way of example, comprises an angled-dual-axis confocal scanning head (ADACSH) 201 and a vertical translation means in the form of a movable carriage 202. For the purpose of illustration, angled-dual-axis confocal scanning head 201 is in a simplified schematic form of the embodiment shown in FIG. 1A (or FIG. 1C), although any other embodiments according to the present invention can be equivalently utilized. In the embodiment of FIG. 2A, angled-dual-axis confocal scanning head 201 is attached to and further enclosed in movable carriage 202, with optical fibers 103, 104 extending to the outside of movable carriage 202. A first transparent window 203 is mounted on movable carriage 202 for passage of illumination beam 117 and observation beam 118. Movable carriage 202 can move up and down in a vertical direction as defined by arrow 204, causing angled-dual-axis confocal scanning head 201 to move toward or away from object 120 in the process. By doing so, confocal overlapping volume 121 of illumination beam 117 and observation beam 118 further deepen into (or retract from) the interior of object 120, whereby a succession of arc-line scans that progressively deepen into object 120 along a vertical cross-section plane 210 is produced, as illustrated by curves 205, providing a vertical cross-section scan. The motion of movable carriage 202 can be driven by a variety of means, for instance, by coupling it to a motor (not shown in FIG. 2A) that is activated by a magnetic, hydraulic, piezoelectric, or other actuator. A skilled artisan can accordingly implement a movable stage suitable for a given application.

As illumination beam 117 and observation beam 118 deepen into the interior of object 120 in the course of vertical scanning, the change in their respective optical path lengths becomes increasingly large, which may cause their respective focal volumes to no longer intersect in an optimal manner, or even not to intersect at all at the point where the two beams physically meet. Furthermore, in interferometry applications such as optical coherence microscopy, the optical path lengths of illumination beam 117 and observation beam 118 must stay substantially fixed in order to ensure coherent interference of predominantly single-scattered light. To maintain the optical path lengths of illumination beam 117 and observation beam 118 during vertical scanning, the space between movable carriage 202 and object 120 can be filled with a substantially transparent fluid 206 having an index of refraction that is substantially the same as the index of refraction of object 120, such that the optical path lengths of illumination beam 117 and observation beam 118 remain unchanged in the course of vertical scanning. The use of optical fibers further provides the necessary flexibility that enables the whole assembly of angled-dual-axis confocal scanning head 201 and movable carriage 202 to move up and down without incurring additional change in the optical path lengths of illumination beam 117 and observation beam 118. In the embodiment of FIG. 2A, movable carriage 202, along with angled-dual-axis confocal scanning head 201, is disposed within a container 207 filled with fluid 206. An O-ring seal 211 is provided to seal fluid 206 inside container 207, while still permitting movable carriage 202 to move up and down relative to container 207. Container 207 is equipped with a second transparent window 208, in optical alignment with first transparent window 203 for passage of illumination and observation beams 117, 118. Container 207 is further connected to a fluid injection system 209, serving as a reservoir for replenishing additional fluid or receiving excess fluid as movable carriage 202 is moving towards or away from object 120. For imaging of human tissue and other biological samples, fluid 206 can be water, which has an index of refraction closely matching that of tissue and biological samples.

It should be noted that certain aberrations of the illumination and observation beams may occur as a result of successive passages of the beams through first and second transparent windows 203, 208, fluid 206, and object 120 in the above embodiment, which may require specific designs of the illumination and observation focusing elements that are corrected for these aberrations. Alternatively, auxiliary optical elements that are properly designed for correcting such aberrations may be implemented in the angled-dual-axis focusing means. In most cases of a converging beam passing through a window or into another object at an inclined angle, the primary aberrations to be corrected for will be spherical aberration, astigmatism, and coma. The magnitude of these aberrations depend upon many factors, and typically increases with NA of the focusing elements, the index of refraction and the thickness of the window, and the angle of incidence. The design of such aberration-corrected focusing elements, or the auxiliary optical elements for correcting aberrations, can be accomplished by a lens designer of ordinary skill and with the help of an optical design computer program such as Zemax™.

In applications where the NA of the focusing elements in the angled-dual-axis focusing means are sufficiently low and the thicknesses of windows, fluid and object through which the illumination and observation beams successively traverse are not large, the aberrations would be small and may not need to be corrected. In such cases, the embodiment shown in FIG. 2A can be utilized, which may incorporate additional remedies for further minimizing aberrations. Such remedies include, for example, using windows made of Teflon AF™ or other materials that are transparent and have an index of refraction closely matching that of water.

Figure 2B:
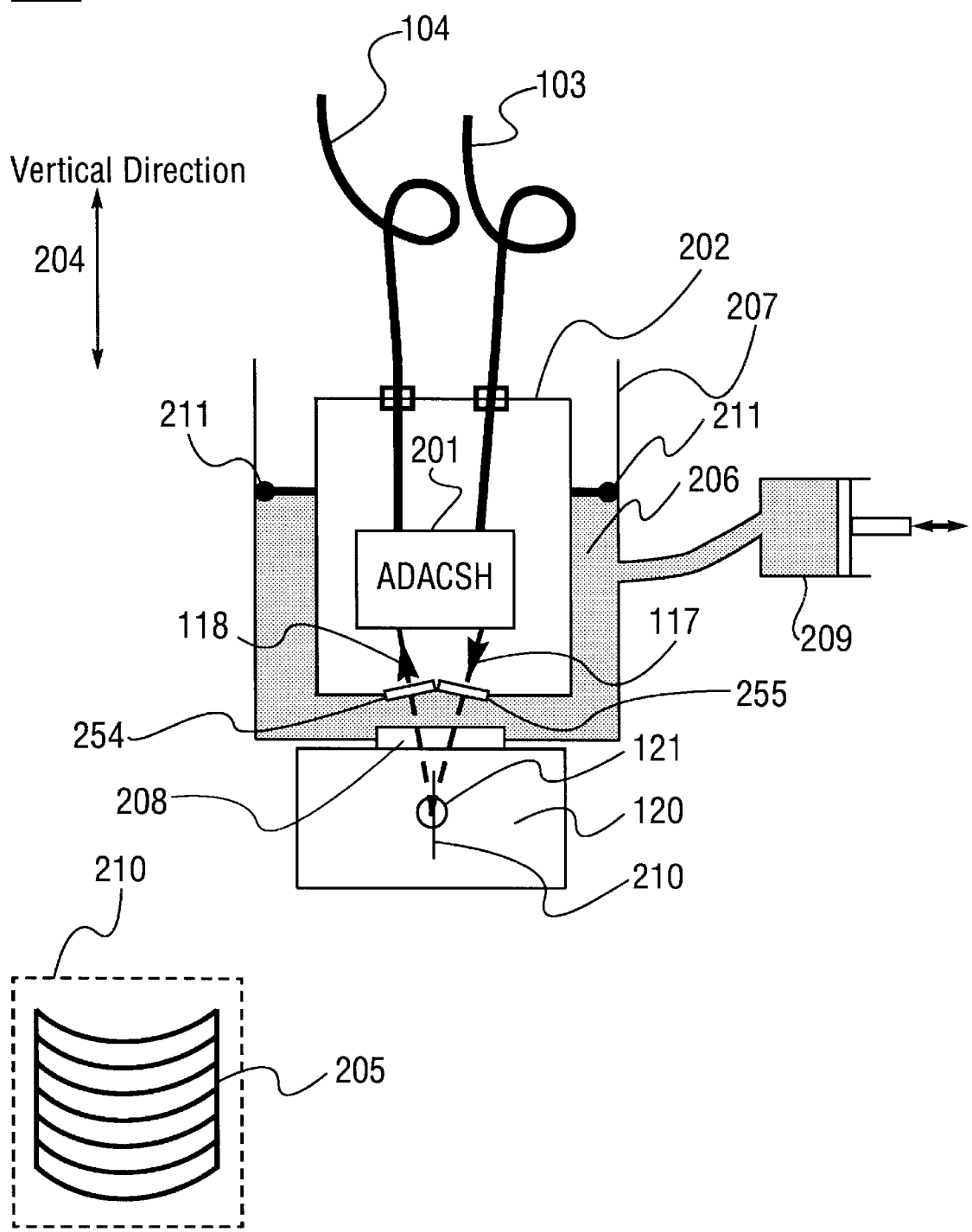

FIG. 2B depicts a second embodiment of an angled-dual-axis confocal scanning microscope of the present invention, pertaining to applications where the aforementioned aberrations may not be negligible. In angled-dual-axis confocal scanning microscope 250, a window assembly comprising two flat transparent windows 254, 255 in an angled arrangement is implemented to replace single flat window 203 in FIG. 2A. The remainder of angled-dual-axis confocal scanning microscope 250 shares the same components as angled-dual-axis confocal scanning microscope 200 shown in FIG. 2A. The window assembly is designed such that illumination axis 97 along with illumination beam 117 and observation axis 96 along with observation beam 118 (see FIG. 1B) are substantially perpendicular to windows 255, 254, respectively. As such, the window assembly can greatly reduce coma and astigmatism that would otherwise be associated with using a single flat window (such as window 203 in FIG. 2A). Although spherical aberrations still need to be corrected for in this case, the techniques for making such corrections are well known in the art of lens design. For instance, a skilled artisan can make use of the design of microscope objectives that are corrected for glass coverslips of a certain thickness to accomplish this task.

All in all, angled-dual-axis confocal scanning microscope 200 or 250 of the present invention is designed such that it provides a vertical cross-section scan of an object with enhanced axial resolution, faster speed, and larger transverse field of view. Moreover, by moving angled-dual-axis confocal scanning microscope 200 or 250, or translating the object, in a transverse direction perpendicular to vertical cross-section plane 210 illustrated in FIG. 2A or FIG. 2B, a series of vertical cross-section scans can be taken in a layer-by-layer fashion, which can be assembled to provide a three-dimensional volume image of the object.

Figure 2C:
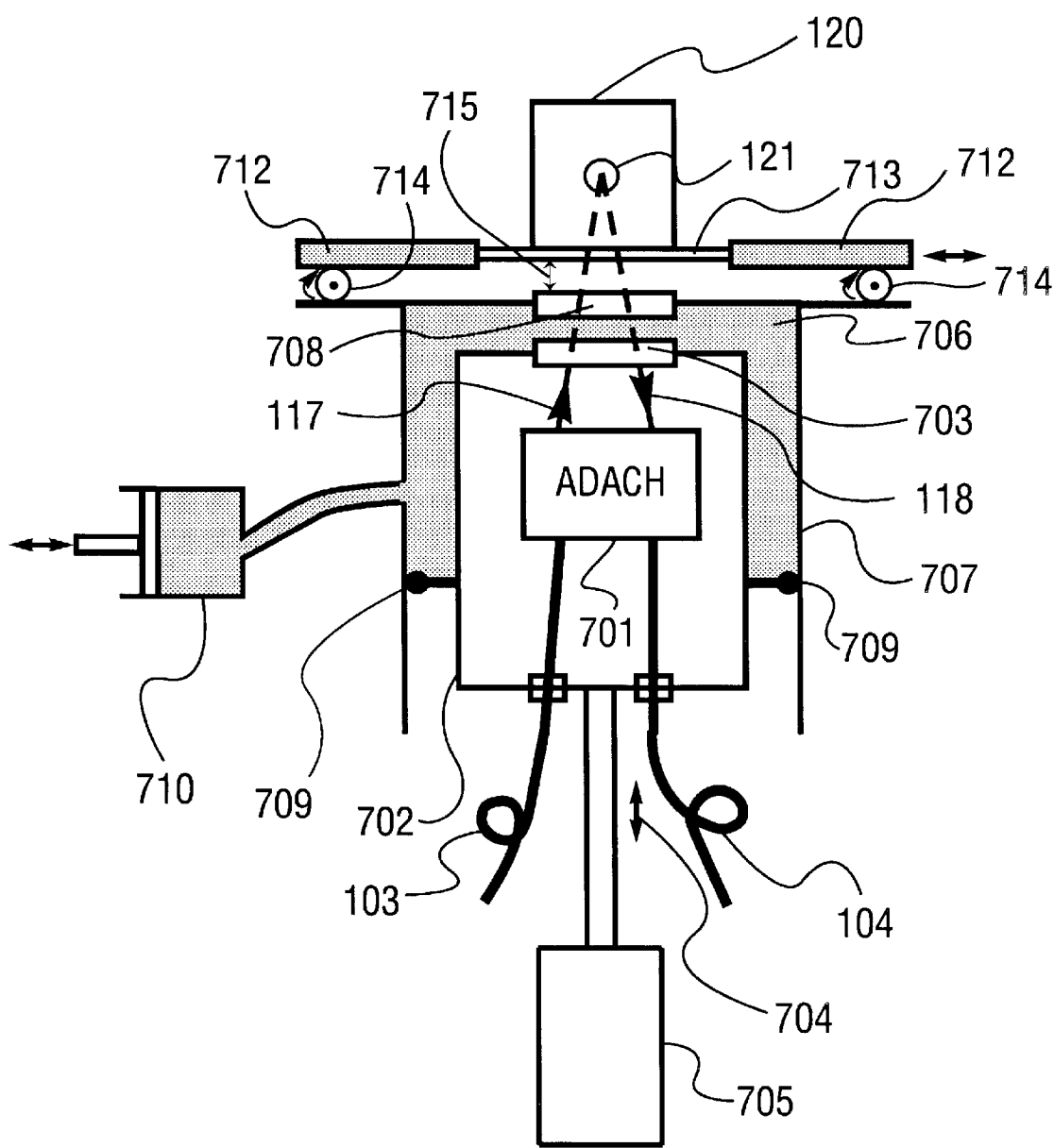

FIG. 2C depicts a third embodiment of an angled-dual-axis confocal scanning microscope of the present invention. Angled-dual-axis confocal microscope 700, by way of example, comprises an angled-dual-axis confocal head (ADACH) 701, a vertical translation means in the form of a movable carriage 702, and a transverse scanning means in the form of transverse stage 212. For the purpose of illustration, angled-dual-axis confocal scanning head 701 is in a simplified schematic form of the embodiment shown in FIG. 1A (or FIG. 1C), although any other embodiments according to the present invention can be equivalently utilized. In the embodiment of FIG. 2C, angled-dual-axis confocal head 701 is attached to and further enclosed in movable carriage 702, with first and second optical fibers 103, 104 extending to the outside of movable carriage 702. A first transparent window 703 is mounted on movable carriage 702 for passage of illumination beam 117 and observation beam 118. Driven by a motor 705, movable carriage 202 can move up and down along a vertical (or axial) direction as defined by arrow 704, causing angled-dual-axis confocal head 701 to move toward or away from object 120 in the process. By doing so, confocal overlapping volume 121 of illumination beam 117 and observation beam 118 deepens into (or retracts from) the interior of object 120, whereby producing a vertical scan. Motor 705 can be actuated by a variety of means, such as magnetic, hydraulic, piezoelectric, and other actuators. A skilled artisan can accordingly devise a movable carriage mechanically driven by a motor suitable for a given application.

As in the embodiment of FIG. 2A or FIG. 2B, movable carriage 702, along with angled-dual-axis confocal head 701, is disposed within a container 707 filled with a substantially transparent fluid 706 having an index of refraction that is substantially the same as the index of refraction of object 120, such that the optical path lengths of illumination beam 117 and observation beam 118 remain substantially unchanged in the course of vertical scanning. The use of optical fibers further provides the necessary flexibility that enables the whole assembly of angled-dual-axis confocal head 701 and movable carriage 702 to move up and down without incurring additional changes in the optical path lengths of illumination beam 117 and observation beam 118. An O-ring seal 709 is provided to seal fluid 706 inside container 707, while still permitting movable carriage 702 to move up and down relative to container 707. A second transparent window 708 is mounted on container 707, such that it is in optical communication with first transparent window 703 for passage of illumination and observation beams 117, 118. Container 707 is further connected to a fluid injection system 710, serving as a reservoir for replenishing additional fluid or receiving excess fluid as movable carriage 702 is moving towards or away from object 120. As described in FIG. 2A, fluid 706 can be water, for it has an index of refraction closely matching that of human tissue and other biological samples.

It should be noted that a window assembly, similar to the window assembly shown in FIG. 2B, can be implemented to replace window 703 in applications where aberrations need to be minimized, as described above. Further minimization of possible aberrations can be accomplished by filling a space between second and third windows 708, 713 with a fluid, which has an index of refraction substantially close to that of fluid 706. Alternatively, distance 715 can be made very small, and second and third windows 708, 713 can be made of Teflon AF™, to further decrease coma and astigmatism. Although spherical aberrations still need to be corrected for in this case, the techniques for making such corrections are well known in the art of lens design. For instance, a skilled artisan can make use of the design of microscope objectives that are corrected for glass coverslips of a certain thickness to accomplish this task.

Angled-dual-axis confocal scanning microscope 700 further comprises a transverse stage 712 for producing transverse scans. A third transparent window 713, in optical communication with second transparent window 708, is mounted on transverse stage 712 for passage of illumination and observation beams 117, 118. Object 120 is in turn placed on third transparent window 713. Transverse stage 712 is mechanically coupled to two or more ball bearings (or wheels) 714, which enable transverse stage 212 along with object 120 to translate relative to angled-dual-axis confocal head 701 along transverse directions perpendicular to the vertical direction 704, whereby producing a transverse scan. Ball bearings 714 also serve to keep the distance 715 between second transparent window 708 and third transparent window 713 constant, so as to preserve the optical path lengths of illumination and observation beams 117, 118 in the course of scanning.

As such, angled-dual-axis confocal scanning microscope 700 of the present invention is capable of providing transverse and vertical scans in various ways. For example, it can produce a line scan along the vertical direction 704, termed a vertical-line scan hereinafter; a vertical cross-section scan comprising a plurality of vertical-line scans that are assembled along a transverse direction perpendicular to the vertical direction 704; a line scan along a transverse direction perpendicular to the vertical direction 704, termed a transverse-line scan hereinafter; and a transverse cross-section scan comprising a plurality of transverse-line scans assembled in a transverse plane perpendicular to the vertical direction 704; and so on. Furthermore, by assembling a plurality of transverse cross-section scans that progressively deepens into the object, by assembling a plurality of vertical cross-section scans that move incrementally in a transverse direction (perpendicular to each vertical cross-section scan), or by assembling an assortment of transverse-line scans along different transverse directions and vertical-line scans, a three-dimensional volume image of the object can be constructed.

For tissue imaging applications, the wavelength of light generally ranges from about 0.8 microns to 1.6 microns, since biological tissue samples are particularly transparent in this range. Embodiments of the angled-dual-axis confocal scanning microscope of the present invention are capable of achieving a resolution of about 1–5 microns in the axial (e.g., the vertical direction shown in FIGS. 2A–2C) as well as the transverse directions, by use of illumination and observation lenses with NA typically ranging from 0.1 to 0.4, and the intersecting angle θ typically ranging from 45° to 90°. The vertical cross-section scan area is typically on the order of about 0.5–1 millimeter in both directions. In terms of scanning capabilities, the fast scan rate along an arc-line typically ranges from 1 to 10 KHz, and the maximum rotation angle (e.g., φ in FIG. 1A) from a neutral position of the scanning mirror (e.g., scanning mirror 111 in FIG. 1A) may range from one to several degrees. Generally, the smaller and the lighter the scanning mirror, the faster the scanning rate. For instance, using a silicon micro-machined scanning mirror can provide scanning rates greater than 10 kHz. The vertical scanning can be performed at a slower rate of 10–60 Hz, which defines the frame rate of vertical cross-section scanning and is in the range of video-rate scanning. Transverse stage 712 scans at a rate slower than the arc-line scanning rate, typically in the range of 0.1 Hz to 100 Hz.

The specific numbers provided above are designed for tissue imaging, to illustrate the utility and the performance of the present invention as a way of example. A skilled artisan can utilize the model calculation provided in Ser. No. 09/628,118 to design an angled-dual axis confocal scanning microscope in accordance with the present invention, for a given application.

It should be pointed out that although optical fibers, particularly single-mode fibers, are preferable as optical coupling means among various optical elements in this invention, and are used throughout this specification wherever optical coupling is called for, other suitable optical coupling means can be alternatively implemented in various angled-dual-axis optical coherence scanning systems of this invention, without deviating from the principle and the scope of the present invention.

Figure 3A:
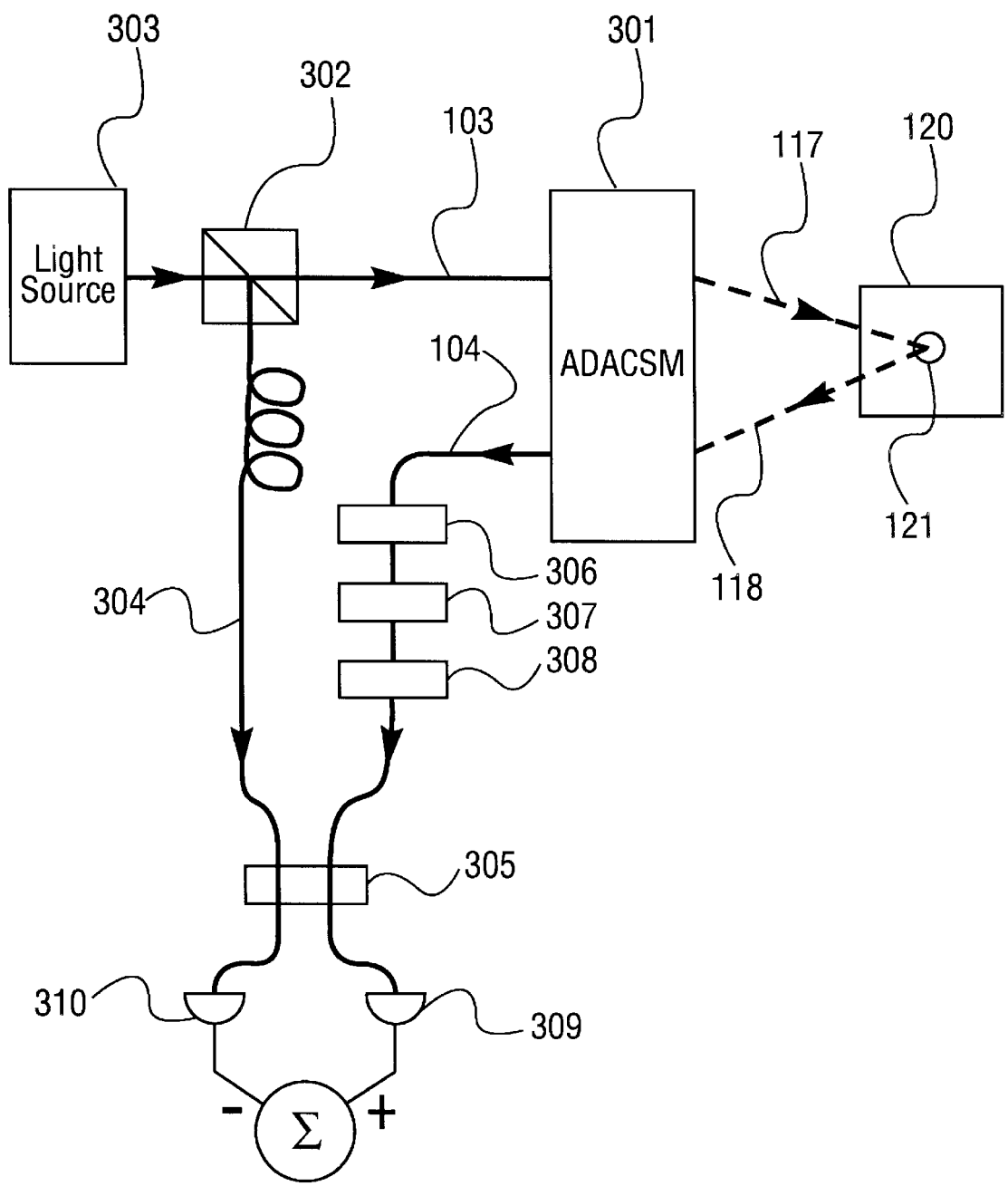
FIGS. 3A–3C illustrate simplified schematic diagrams of first, second and third embodiments of an angled-dual-axis optical coherence scanning microscope.

FIG. 3A depicts a first embodiment of an angled-dual-axis optical coherence scanning microscope of the present invention. Angled-dual-axis optical coherence microscope 300 comprises an angled-dual-axis confocal scanning microscope (ADACSM) 301, a beam-splitting means preferably in the form of a fiber-based beamsplitter 302, a light source 303 having a short coherence length, and a reference optical fiber 304. By way of example, angled-dual-axis confocal scanning microscope 301 is in the form of one of the embodiments shown in FIGS. 2A–2C, although other embodiments in accordance with the present invention can also be implemented. Beamsplitter 302 is optically coupled to light source 303 and angled-dual-axis confocal scanning microscope 301 in such a way that it diverts a portion of an output beam emitted from light source 303 to first optical fiber 103 of angled-dual-axis confocal scanning microscope 301, providing an illumination beam 117, and a remainder of the output beam to reference optical fiber 304, providing a reference beam. An observation beam 118 collected by angled-dual-axis confocal scanning microscope 301 from confocal overlapping volume 121 within object 120 is delivered by way of second optical fiber 104. Second optical fiber 104 and reference fiber 304 are joined by a fiber-optic coupler 305, and optical path lengths of first, second and reference fibers 103, 104, 304 are so selected to ensure coherent interference upon combining the reference and observation beams at fiber-optic coupler 305. The two outputs of fiber-optic coupler 305 are in turn fed to two optical detectors 309, 310, such that a balanced detection scheme is utilized for optimizing the signal-to-noise of detection. The underlying principle of the balanced detection technique as well as its advantages in fiber-optic interferometers are well known in the art, as described by Rollins et al. in "Optimal interferometer designs for optical coherence tomography", Optics Letters, 24(21), pp. 1484 (1999), and by Podoleanu in "Unbalanced versus balanced operation in an optical coherence tomography system", Applied Optics, 39(1), pp. 173 (2000), incorporated herein by reference.

Angled-dual-axis optical coherence scanning microscope 300 further comprises a frequency shifting means 306 optically coupled to, by way of example, second optical fiber 104 of angled-dual-axis confocal scanning microscope 301, such that the frequency of the observation beam is shifted relative to the frequency of the reference beam. Alternatively, a frequency shifting means may be optically coupled to first optical fiber 103, which also results in the frequency of the observation beam being shifted relative to the frequency of the reference beam. Moreover, a frequency shifting means can be coupled to reference optical fiber 304, such that the frequency of the reference beam is shifted relative to the frequency of the observation beam. The end result in each case is that coherent interference between the reference and observation beams is modulated at a heterodyne beat frequency given by the relative frequency shift between the two beams, allowing for heterodyne balanced detection. In addition, an adjustable optical delay device 307 is coupled to, by way of example, second optical fiber 104, so as to maintain coherent interference between the reference and observation beams at fiber-optic coupler 305 where they are combined. An optical delay device may be alternatively coupled to reference fiber 304, or first optical fiber 103, for the same purpose. In applications where light source 303 has a short coherence length, optical delay device 307 can be adjusted such that mostly single-scattered light in observation beam 118 is coherent with the reference beam at fiber-optic coupler 305 and multiple-scattered light, which traverses over a larger optical path length in observation beam 118, does not contribute to the coherent interference, therefore providing further filtering of multiple-scattered light upon detection. To enhance the signal-to-noise ratio of detection of weak optical signals, an optical amplifier 308, such as a two-port fiber amplifier or a semiconductor optical amplifier, is optically coupled to second optical fiber 104, so as to boost up the power of the observation beam. An amplified observation beam has an additional advantage of rendering faster scanning rates and consequently higher pixel rates without appreciable loss in the signal-to-noise ratio, because a shorter integration time per pixel of an image is required upon data collection. The balanced detection scheme allows subtraction of amplifier noise, since preponderance of spontaneous emission of optical amplifier 308 would not occur at the heterodyne beat frequency described above.

In general, light source 303 in the above embodiment can be an optical fiber amplifier, a semiconductor optical amplifier, a fiber laser, a semiconductor laser, a diode-pumped solid state laser, or a broadband OCT source commonly used in optical coherence tomography applications. It may be polarized, or unpolarized. The light source preferably has a coherence length of less than 3000 microns (for applications involving imaging within a highly scattering medium such as human skin, wavelengths in the range of 0.8 to 1.6 microns typically allow imaging to depths of no more than 3,000 microns). For biological applications, the light source should produce light in the wavelength range of 0.8 to 1.6 microns, since biological tissues are particularly transparent in this range. Beamsplitter 302 can be a fiber-optic coupler, such as an evanescent wave coupler or a fused fiber coupler. Various optical fibers, such as first, second, and reference optical fibers 103, 104, 304, are preferably single-mode fibers, for single-mode fibers have the advantage of simplicity and automatic assurance of the mutual spatial coherence of the observation and reference beams upon mixing and detection.

In one case where light source 303 in the above embodiment produces polarized light and beamsplitter 302 is a polarizing beamsplitter, the orientation of polarizing beamsplitter 302 relative to the polarization of the light can be used to control the ratio of optical power between the illumination and reference beams. First, second, and reference optical fibers 103, 104, 304 are preferably polarization maintaining (PM) fibers, to provide control of the polarizations of the illumination, observation and reference beams throughout the system. In this case, the reference and observation beams can be brought into the same polarization by an appropriate rotation of second optical fiber 104 or reference optical fiber 304, before they are joined at fiber-optic coupler 305. Alternatively, a polarization rotation means, such as a Faraday rotator or a rotatable fiber connector, can be coupled to either reference optical fiber 304 or second optical fiber 104, such that the reference and observation beams have substantially the same polarization when combined.

In another case where light source 303 is a polarized light source, beamsplitter 302 may alternatively be a polarization maintaining fiber-optic coupler. Likewise, polarization maintaining fibers should be implemented throughout the system, to provide control of the polarization states of the beams, thereby ensuring maximum coherent interference between the observation and reference beams upon being combined.

Figure 3B:
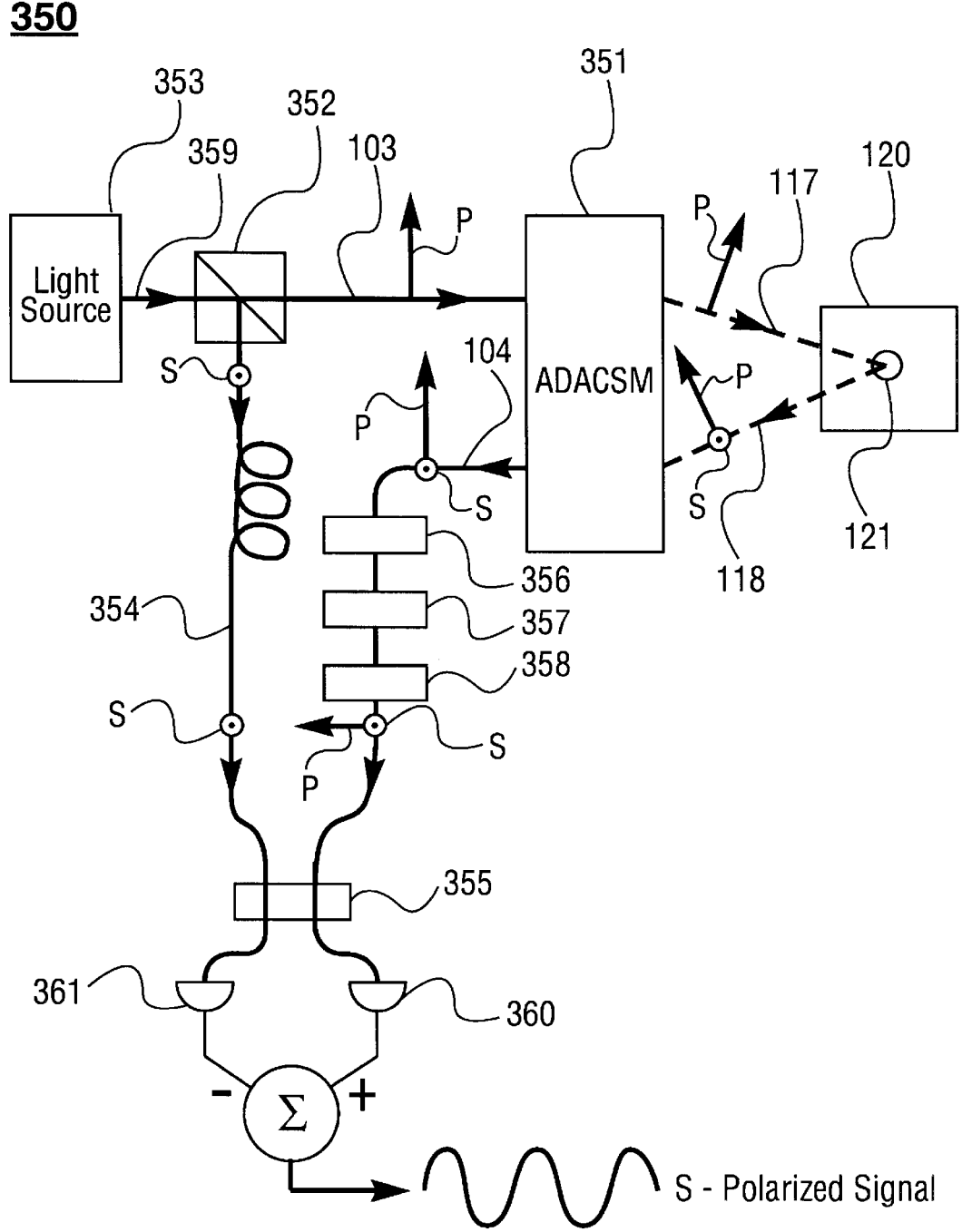

The embodiment described above can be further used to provide specific information pertaining to the polarization state of light upon being reflected from a polarization-altering, such as birefrigent-scattering, medium. Many biological tissues, such as tendons, muscle, nerve, bone, cartilage and teeth, exhibit birefrigence due to their linear or fibrous structure. Birefrigence causes the polarization state of light to be altered (e.g., rotated) in a prescribed manner upon refection. Skin is another birefrigent medium. Collagen contained in skin is a weakly birefrigent material. Moreover, at temperatures between 56–65° C., collagen denatures and loses its birefrigence. Thus, by detecting induced changes in the polarization state of light reflected from a skin sample, an image representing the regions of skin where thermal injury occurs can be identified. FIG. 3B depicts a second embodiment of an angled-dual-axis optical coherence scanning microscope of the present invention, pertaining to applications where polarized light is used to probe a birefrigent-scattering (or other polarization-altering) medium. By way of example, angled-dual-axis optical coherence scanning microscope 350 comprises an angled-dual-axis confocal scanning microscope (ADACSM) 351, a polarizing beamsplitter 352, a polarized light source 353, and a reference polarization maintaining (PM) optical fiber 354. As in FIG. 3A, angled-dual-axis confocal scanning microscope 351 is in the form of one of the embodiments shown in FIGS. 2A–2C, with first and second optical fibers 103, 104 being polarization maintaining (PM) fibers capable of supporting two orthogonal polarizations. Polarizing beamsplitter 352 is optically coupled to polarized light source 353 by way of a third PM fiber 359, such that it diverts a portion of a polarized output beam emitted from light source 353 to first PM fiber 103, providing an illumination beam 117 with P-polarization to angled-dual-axis confocal scanning microscope 351, and a remainder of the output beam to reference PM fiber 354, providing a reference beam with S-polarization. P-polarization and S-polarization are orthogonal to each other. The orientation of polarizing beamsplitter 352 relative to the polarization of the output beam from light source 353 can be used to control the ratio of optical power between the illumination and reference beams. An observation beam 118 reflected from confocal overlapping volume 121 within an object 120 carries both P-polarization and S-polarization, where the presence of S-polarization is resulted from birefrigent (or other polarization-altering) "scatterers" in object 120. A frequency shifting means 356 is optically coupled to second PM fiber 104, such that the frequency of observation beam 118 is shifted relative to the frequency of the reference beam. Second PM fiber 104 and reference PM fiber 354 are joined by a polarization maintaining (PM) fiber-optic coupler 355, where only observation beam 118 with S-polarization is coherently combined with the reference beam that has only S-polarization. The two outputs of fiber-optic coupler 355 are in turn fed to two optical detectors 360, 361, so as to utilize balanced detection scheme for optimizing the signal-to-noise of detection. The amplitude of resulting heterodyne beat frequency signal, i.e, S-polarized Signal depicted in FIG. 3B, corresponds only to the amplitude of reflectance of light with S-polarization, from which an image representing birefrigent (and/or other polarization-altering) "scatterers" in object 120 can be constructed. Take skin as an example. If thermal damage occurs to a skin sample, the amplitude of S-polarized Signal depicted would be reduced compared to that corresponding to normal skin.

In angled-dual-axis optical coherence scanning microscope 350, a frequency shifting means may be alternatively coupled to reference PM fiber 354, such that the frequency of the reference beam is shifted relative to the frequency of the observation beam. A frequency shifting means may be also coupled to first optical fiber 103, for shifting the frequency of illumination beam 117 and hence observation beam 118 relative to the frequency of the reference beam. In each case the end result is that coherent interference between the reference and observation beams is modulated at a heterodyne beat frequency given by the relative frequency shift between the two beams, allowing for heterodyne balanced detection. In addition, an adjustable optical delay device 357 is coupled to, by way of example, second PM fiber 104, so as to maintain coherent interference between the reference and observation beams at PM fiber-optic coupler 355 where they are combined. An optical delay device may be alternatively coupled to reference PM fiber 354, or first optical fiber 103. In each case, the optical delay device can also be adjusted to provide further filtering of multiple-scattered light upon detection, as described above. To enhance the signal-to-noise ratio upon detection, an optical amplifier 358, such as a two-port fiber amplifier or semiconductor optical amplifier, is coupled to second PM fiber 104, so as to boost up the power of the observation beam. An amplified observation beam brings an additional advantage of allowing faster scanning rates and consequently higher pixel rates without appreciable loss in the signal-to-noise ratio, because a shorter integration time per pixel of an image is required upon data collection. The use of balanced detection in this case allows subtraction of amplifier noise, since spontaneous emission of optical amplifier 358 would not occur at the heterodyne beat frequency described above.

It should be noted that the aforementioned embodiment can also be used to detect P-polarization of the observation beam, if so desired in a given application. In such a case, a polarization rotation means, such as a rotatable fiber connector or a Faraday rotator, can be coupled to reference PM fiber 354, serving to rotate the polarization of the reference beam by 90-degree and hence rendering a reference beam with P-polarization. Upon combining the reference and observation beams at PM fiber-optic coupler 355, only the observation beam with P-polarization interferes coherently with the reference beam that now has only P-polarization. As such, the amplitude of resulting heterodyne beat frequency signal measures only the amplitude of reflectance of light with P-polarization.

Figure 3C:
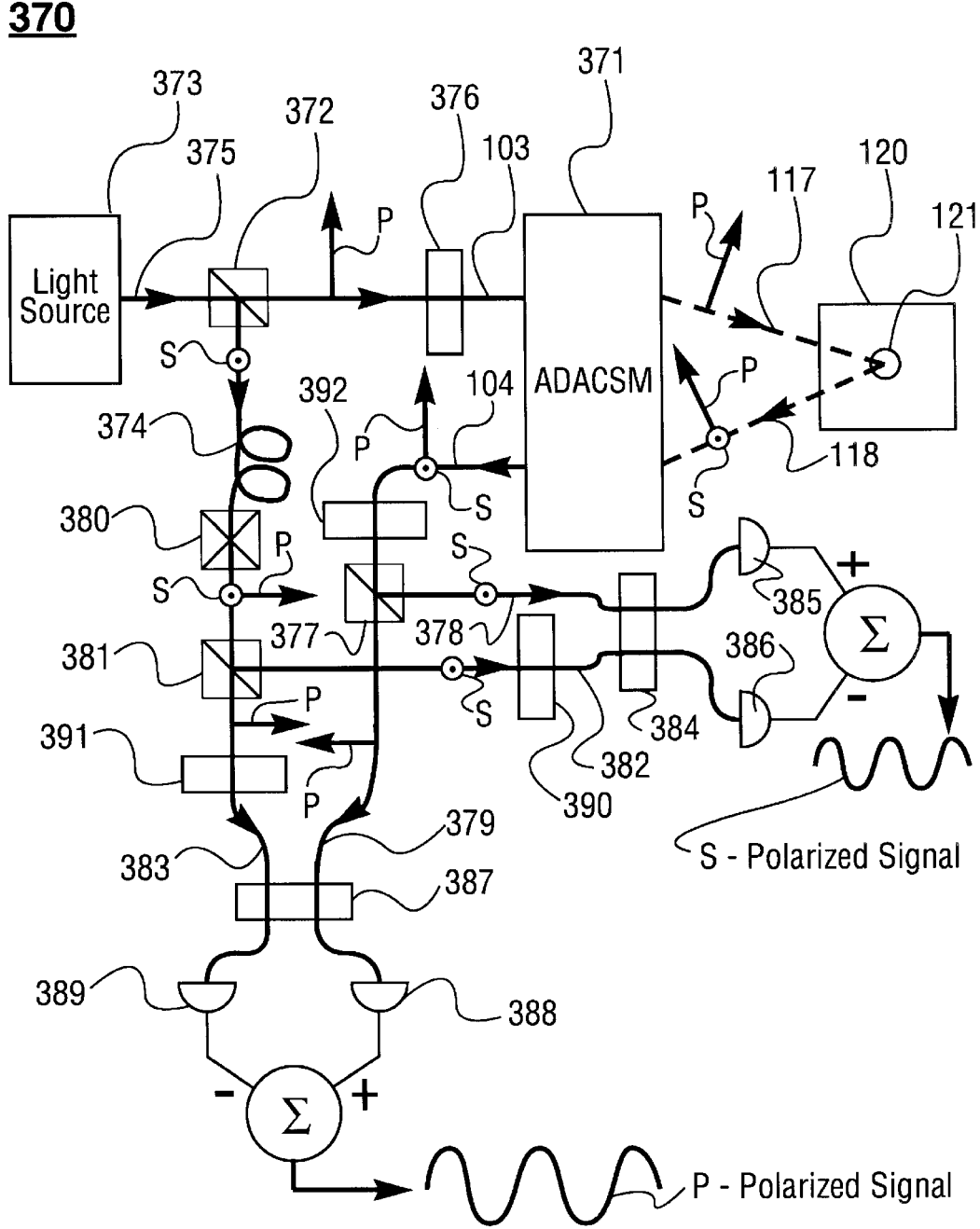

The second embodiment shown in FIG. 3B can be further modified to allow both P-polarization and S-polarization of the observation beam to be detected, hence providing enhanced contrast of an image pertaining to birefrigent-scattering (and/or other polarization-altering) "scatterers" in an object. FIG. 3C shows a third embodiment of an angled-dual-axis optical coherence scanning microscope of the present invention. Angled-dual-axis optical coherence scanning microscope 370, by way of example, comprises an angled-dual-axis confocal scanning microscope (ADACSM) 371, a first polarizing beamsplitter 372, a polarized light source 373, and a reference polarization maintaining (PM) optical fiber 374. As in FIG. 3B, angled-dual-axis confocal scanning microscope 371 is in the form of one of the embodiments shown in FIGS. 2A–2C, with first and second optical fibers 103, 104 being polarization maintaining (PM) fibers capable of supporting two orthogonal polarizations. Polarizing beamsplitter 372 is optically coupled to polarized light source 373 by way of a third PM fiber 375, such that it diverts a portion of a polarized output beam emitted from light source 373 to first PM fiber 103, providing an illumination beam 117 with P-polarization to angled-dual-axis confocal scanning microscope 371, and a remainder of the output beam to reference PM fiber 374, providing a reference beam with S-polarization. P-polarization and S-polarization are mutually orthogonal. The orientation of polarizing beamsplitter 372 relative to the polarization of the output beam from light source 373 can be used to control the ratio of optical power between the illumination and reference beams. An observation beam 118 reflected from confocal overlapping volume 121 within an object 120 carries both P-polarization and S-polarization, owing to birefrigent (or other polarization-altering) "scatterers" in object 120. A frequency shifting means 376 is optically coupled to first PM fiber 103, such that the frequency of illumination beam 117 and hence the frequency of observation beam 118 are shifted relative to the reference beam. Second PM fiber 104 is optically coupled to a second polarizing beamsplitter 377, which routes S-polarization and P-polarization of observation beam 118 to forth PM fiber 378 and fifth PM fiber 379, respectively. Reference PM fiber 374 is optically coupled to a polarization rotation means 380, such as a rotatable fiber-optic connector or a Faraday rotator, serving to rotate the polarization of the reference beam by 45-degree, effectively rendering the reference beam with both P-polarization and S-polarization. A third polarizing beamsplitter 381 in turn receives the reference beam from polarization rotation means 380, and routes S-polarization and P-polarization of the reference beam to sixth PM fiber 382 and seventh PM fiber 383, respectively. Fourth PM fiber 378 and sixth PM fiber 382 are joined by a first polarization maintaining (PM) fiber-optic coupler 384, where S-polarization of the observation beam is coherently combined with S-polarization of the reference beam. Illustrated as S-polarized Signal in FIG. 3C, the amplitude of resulting heterodyne beat frequency signal provides a measure of the amplitude of reflectance of light with S-polarization. The two outputs of first polarization maintaining (PM) fiber-optic coupler 384 are fed to first and second optical detectors 385, 386, such that balanced heterodyne detection scheme is utilized for optimizing the signal-to-noise ratio of detection. Likewise, fifth PM fiber 379 and seventh PM fiber 383 are joined by a second polarization maintaining (PM) fiber-optic coupler 387, where P-polarization of the observation beam is coherently combined with P-polarization of the reference beam. Illustrated as P-Polarized Signal in FIG. 3C, the amplitude of resulting heterodyne beat frequency signal measures only the amplitude of reflectance of light with P-polarization. The two outputs of second polarization maintaining (PM) fiber-optic coupler 387 are fed to third and fourth optical detectors 388, 389, to provide for a balanced heterodyne detection scheme. The simultaneous detection of both P-polarization and S-polarization of the observation beam yields an enhanced contrast image representing birefrigent (and/or other polarization-altering) "scatterers" in object 120. For example, P-Polarized Signal and S-Polarized Signal can be combined in various ways to produce a polarization image, such as [(P-Polarized Signal)–(S-Polarized Signal)]/[(P-Polarized Signal)+(S-Polarized Signal)]. This particular way of processing the signals can help discriminate the portion of light reflected by the polarization-altering scatterers from the portion of light that is randomly polarized by multiple-scattered events.

Angled-dual-axis optical coherence scanning microscope 370 further comprises a first adjustable optical delay device 390 optically coupled to, by way of example, sixth PM fiber 382, to maintain coherent interference between the S-polarized reference and observation beams upon mixing and detection. An adjustable optical delay device may be alternatively coupled to fourth PM fiber 378, to achieve the same purpose. Moreover, a second adjustable optical delay device 391 is optically coupled to, by way of example, seventh PM fiber 383, to maintain coherent interference between the P-polarized reference and observation beams upon mixing and detection. An adjustable optical delay device can be alternatively coupled to fifth PM fiber 379, for the same purpose. Separate optical delay adjustments for P-polarization and S-polarization are necessary, because the polarization mode dispersion (PDM) of the PM fibers causes the two orthogonal polarization modes to travel over different optical path lengths along a given length of the PM fiber. Therefore, these optical delay devices can be separately adjusted to provide coherence interference of the two beams in each polarization mode. In addition, an optical amplifier 392, such as a two-port polarization-sensitive fiber optical amplifier or semiconductor optical amplifier, is optically coupled to second PM fiber 104, to boost up the power of the observation beam. An amplified observation beam allows faster scanning rates and consequently higher pixel rates without appreciable loss in the signal-to-noise ratio, because a shorter integration time per pixel of an image is required upon data collection. The balanced heterodyne detection schemes implemented for measuring both S-polarized and P-polarized signals enable the amplifier noise to be subtracted in each case, since preponderance of spontaneous emission of optical amplifier 392 would not occur at the heterodyne beat frequency.

In the embodiment of FIG. 3B or FIG. 3C, various optical fibers employed are preferably single-mode, polarization maintaining fibers capable of supporting two orthogonal polarizations. The polarization mode dispersion (PMD) in the interferometer can be minimized by use of short single-mode fiber lengths in the arms of the observation and reference beams, as a particular application warrants. If other types of optical fibers are to be alternatively employed in the system, it would be preferable to implement fiber-optic polarization controllers accordingly in the arms of the interferometer, so as to provide control of the polarizations of the observation and reference beams. The use of such fiber-optic polarization controllers with non PM single-mode fibers is well known in the art of optical coherence tomography.

It should also be noted that light source 353 in FIG. 3B (or light source 373 in FIG. 3C) can be an unpolarized light source, in general. In such a case, the use of polarizing beamsplitter 352 (or polarizing beamsplitter 372 in FIG. 3C) would generate a polarized illumination beam and a polarized reference beam with orthogonal polarizations from an unpolarized beam emitted from the light source. A disadvantage of using an unpolarized light source is, however, that the ratio of optical power between the illumination and reference beams cannot be efficiently adjusted to best suit a particular application.

In all cases involving polarized light, it is important to carefully control the polarization states of the observation and reference beams, such that coherent interference between the two beams is maximized when combined. Those skilled in the art of fiber-optic interferometers or gyroscopes will know how to implement various polarization maintaining and/or controlling means to achieve this purpose.

Figure 4:
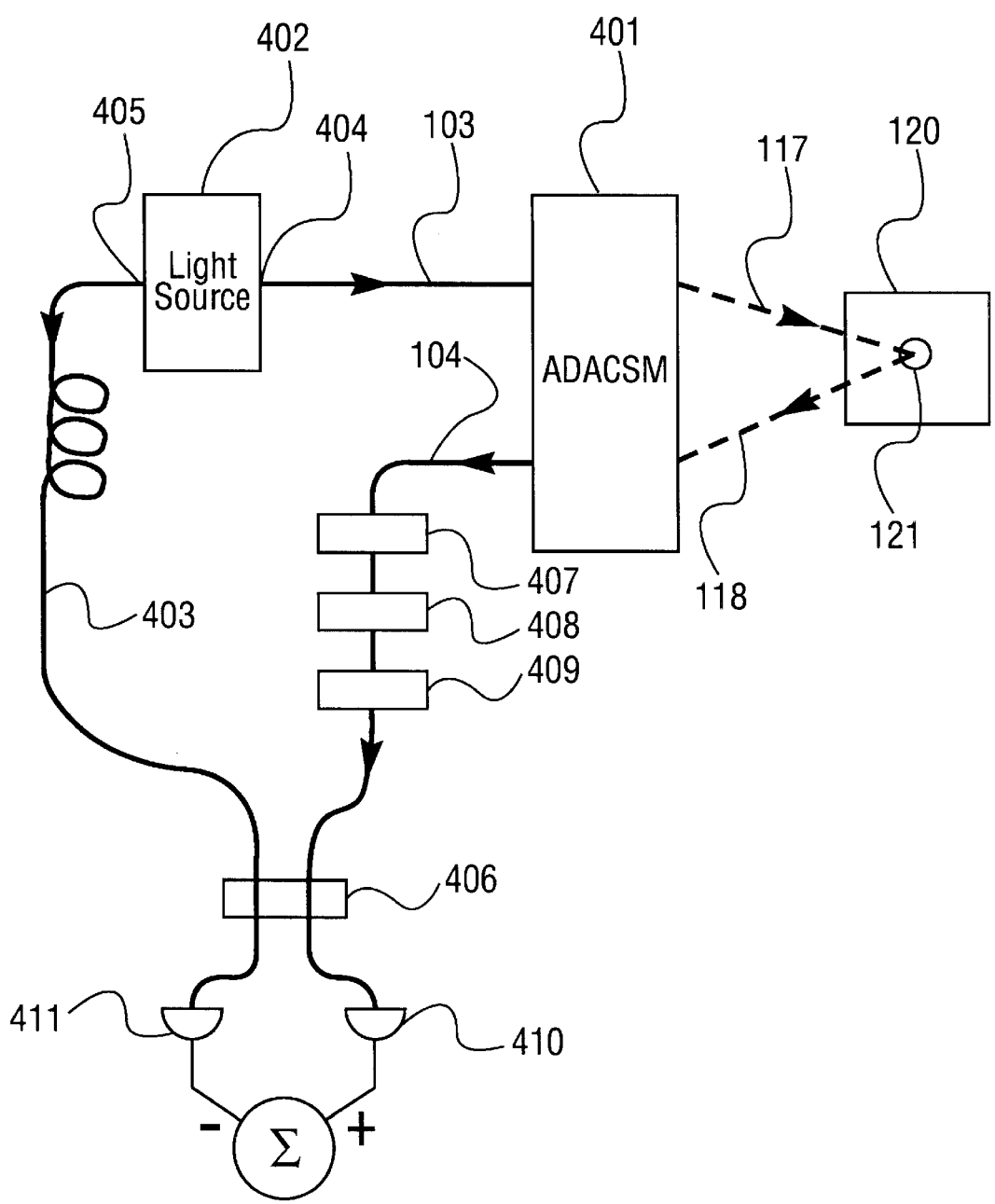
FIG. 4 depicts a simplified schematic diagram of a fourth embodiment of an angled-dual-axis optical coherence scanning microscope of the present invention.

FIG. 4 shows a fourth embodiment of an angled-dual-axis optical coherence scanning microscope of the present invention. Angled-dual-axis optical coherence scanning microscope 400 comprises an angled-dual-axis confocal scanning microscope (ADACSM) 401, a light source 402, and a reference optical fiber 403. A first output port 404 of light source 402 is optically coupled to first optical fiber 103, transmitting an illumination beam 117 to angled-dual-axis confocal scanning microscope 401. A second output port 405 of light source 402 is optically coupled to reference optical fiber 403, providing a reference beam. An observation beam 118 collected by angled-dual-axis confocal scanning microscope 401 is delivered by way of second optical fiber 104 of angled-dual-axis confocal scanning microscope 401. Reference optical fiber 403 and second optical fiber 104 are further joined by a fiber-optic coupler 406, and optical path lengths of first, second and reference fibers 103, 104, 403, are so selected to ensure coherent interference upon combining the reference and observation beams at fiber-optic coupler 406. The two outputs of fiber-optic coupler 406 are fed to two optical detectors 410, 411, such that a balanced detection scheme is utilized for maximizing the signal-to-noise ratio of detection.

Angled-dual-axis optical coherence scanning microscope 400 further comprises a frequency shifting means 407 optically coupled, by way of example, second optical fiber 104, such that the frequency of observation beam 118 is shifted relative to the frequency of the reference beam. A frequency shifting means can also be coupled to first optical fiber 103, for the same purpose of shifting the frequency of the observation beam. Alternatively, a frequency shifting means may be optically coupled to reference optical fiber 403, such that the frequency of the reference beam is shifted relative to the frequency of the observation beam. The end result in each case is that coherent interference between the reference and observation beams is modulated at a heterodyne beat frequency given by the relative frequency shift between the two beams, allowing for heterodyne balanced detection. In addition, an adjustable optical delay device 408 is optically coupled to, by way of example, second optical fiber 104, so as to maintain coherent interference between the reference and observation beams at fiber-optic coupler 406 where they are combined. An optical delay device may be alternatively coupled to reference optical fiber 403, or first optical fiber 103. In each case, the optical delay device can also be adjusted to provide further filtering of multiple-scattered light upon detection, as described above. To enhance the signal-to-noise ratio of detection of weak optical signals, an optical amplifier 409, such as a two-port fiber amplifier or a semiconductor optical amplifier, is optically coupled to second optical fiber 104, so as to boost up the power of the observation beam. An amplified observation beam allows faster scanning rates and consequently higher pixel rates without appreciable loss in the signal-to-noise ratio, because a shorter integration time per pixel of an image is required upon data collection. The balanced detection scheme allows subtraction of amplifier noise, since preponderance of spontaneous emission of optical amplifier 409 would not occur at the heterodyne beat frequency described above.

Light source 402 in the above embodiment is preferably a short coherence length source, such as an OCT source commonly used for OCT applications that is modified to have two output-ports. The light source can also be an optical fiber amplifier, a semiconductor optical amplifier, a fiber laser, a semiconductor laser, or a diode-pumped solid state laser, equipped with dual output-ports. The light source preferably has a coherence length of less than 3000 microns. For biological applications, the light source should produce light in the wavelength range of 0.8 to 1.6 microns, since biological tissues are particularly transparent in this range. Various optical fibers, such as first, second, and reference optical fibers 103, 104, 403, are preferably single-mode fibers, for single-mode fibers have the advantage of simplicity and automatic assurance of the mutual spatial coherence of the observation and reference beams upon mixing and detection. If polarized light is provided by light source 402, first, second, and reference optical fibers 103, 104, 403, are preferably polarization maintaining fibers. In such a case, the reference and observation beams can be brought into the same polarization by an appropriate rotation of either second optical fiber 104 or reference optical fiber 403, before they are joined by fiber-optic coupler 406. Alternatively, a polarization rotation means, such as a Faraday rotator or a rotatable fiber connector, can be optically coupled to either reference optical fiber 403 or second optical fiber 104, such that the reference and observation beams have substantially the same polarization when combined.

Moreover, the embodiment of FIG. 4 can be further modified, in ways similar to the embodiments depicted in FIGS. 3B–3C, to image a polarization-altering (e.g., a birefrigent-scattering) medium. Those skilled in the art can implement such modifications in accordance with the present invention for a given application.

It should be noted that to provide the frequency shifting means, a phase modulator can be implemented in the embodiments describe above for modulating the phase of either the reference or observation beam, such that heterodyne coherent interference is produced between the reference and observation beams. The phase modulator can be a piezoelectric fiber stretcher, an electro-optic crystal, an acousto-optic modulator, or any other phase modulator known in the art. It will be apparent to one skilled in the art of heterodyne interferometry techniques that there exist many ways of modulating the phase or shifting the frequency of the observation beam (or the reference beam), such that a detectable beat frequency is generated for detection.

As described above, the angled-dual-axis arrangement between the illumination and observation beams in an angled-dual-axis confocal scanning microscope of the present invention has an inherent advantage of filtering out multiple-scattered light in the illumination beam. And multiple-scattered light can be further eliminated by employing low NA focusing elements (or lenses) in the angled-dual-axis confocal scanning microscope. In an angled-dual-axis optical coherence scanning microscope of the present invention, as exemplified by the embodiments depicted in FIGS. 3A–3C and FIG. 4, multiple-scattered light that originates within the observation beam can be additionally minimized, since the multiple-scattered light in the observation beam are not coherent with the reference beam, owing to the fact that multiple-scattered light travels over a longer optical path length than single-scattered light upon mixing with the reference beam. As such, an angled-dual-axis optical coherence scanning microscope of the present invention can achieve much higher sensitivity and larger dynamic range in detection, and hence enhanced contrast when imaging within a scattering medium. This capability is particularly desirable when imaging in a highly scattering medium, such as biological tissue.

All in all, the unique design of the angled-dual-axis optical coherence scanning microscope of the present invention enables it to achieve many advantages concurrently, as stated throughout this specification, in contrast to many prior art systems where an improvement in one property often occurs at the expense of adversely affecting another property.

When using an angled-dual-axis optical coherence system to scan an object in order to create an image, the beat frequency resulting from heterodyne interference of the reference and observation beams should be selected with consideration of the scanning rate carried out the angled-dual-axis confocal scanning microscope in the system. More specifically, the beat frequency should be substantially higher than the rate at which pixels inside the object are measured, such that the interference magnitude is measured over several cycles. The highest possible resolution of the image corresponds to the dimensions of the confocal overlapping volume, and proper sampling of a region to be imaged requires that more than two pixels per image point be obtained. For example, if pixels are measured at a rate of 1 MHz (fast enough for video), then the beat frequency should be at least about 10 MHz. This will provide 10 interference fringes per pixel, which is sufficient to provide an accurate measure of the reflectance of each pixel. The pixel scanning speed and the beat frequency may depend upon the particular application, of course. If high accuracy is required of the reflectance measurements, then the beat frequency may be increased or the pixel scanning rate may be reduced. Those skilled in the art can accordingly devise a working relationship between the pixel scanning rate and the corresponding beat frequency for a given application.

It should be understood that the embodiments shown FIGS. 3A–3C and FIG. 4 provide only a few of many angled-dual-axis optical coherence scanning microscopes in accordance with the present invention. A skilled artisan may alter those exemplary embodiments in various ways, so as to best suit practical applications, without deviating from the principle and the scope of the present invention.

Although the present invention and its advantages have been described in detail, it should be understood that various changes, substitutions, and alterations can be made herein without departing from the principle and the scope of the invention. Accordingly, the scope of the present invention should be determined by the following claims and their legal equivalents.

What is claimed is:

1. An apparatus for performing angled-dual-axis optical coherence scanning microscopy within a sample, comprising:
   a) a light-generating means for generating an illumination beam and a reference beam;
   b) an angled-dual-axis confocal scanning microscope, comprising:
      i) a first optical fiber having first and second ends, from said first end said illumination beam emerges;
      ii) a second optical fiber having first and second ends;
      iii) an angled-dual-axis focusing means for focusing said illumination beam to an illumination focal volume along an illumination axis within said sample and for receiving an observation beam emanated from an observation focal volume along an observation axis within said sample such that said observation beam is focused onto said first end of said second optical fiber; and
      iv) a scanning means;
      wherein said illumination axis and said observation axis intersect at an angle within said sample, such that said illumination focal volume and said observation focal volume intersect at a confocal overlapping volume, and wherein said scanning means is capable of directing said illumination and observation beams in such a way that said illumination axis and said observation axis remain intersecting at said angle and that said confocal overlapping volume moves within said sample; and
   c) a beam-combining means for combining said reference beam and said observation beam, such that coherent interference between said reference beam and said observation beam is produced.

2. The apparatus of claim 1 wherein said light-generating means comprises:
   a) a light source for emitting an output beam; and
   b) a beam-splitting means in optical communication with said light source and said angled-dual-axis confocal scanning microscope, such that a portion of said output beam is passed into said second end of said first optical fiber and a remainder of said output beam is routed into a first end of a reference optical fiber, wherein said portion of said output beam constitutes said illumination beam and said remainder of said output beam serves as said reference beam.

3. The apparatus of claim 2 wherein said light source comprises an element selected from the group consisting of optical fiber amplifiers, fiber lasers, semiconductor optical amplifiers, semiconductor lasers, and diode-pumped solid state lasers, and broadband OCT light sources.

4. The apparatus of claim 2 wherein said beam-splitting means comprises an element selected from the group consisting of fiber-optic couplers, polarization maintaining fiber-optic couplers, beamsplitters, and polarizing beamsplitters.

5. The apparatus of claim 2 wherein said beam-combining means comprises a fiber-optic coupler, wherein said reference optical fiber and said second optical fiber are joined by said fiber-optic coupler.

6. The apparatus of claim 5 wherein said fiber-optic coupler is a polarization maintaining fiber-optic coupler.

7. The apparatus of claim 1 wherein said light-generating means comprises a light source having first and second output-ports, wherein said first output-port is optically coupled to said second end of said first optical fiber, transmitting said illumination beam to said first optical fiber, and wherein said second output port is optically coupled to a first end of a reference optical fiber, providing said reference beam.

8. The apparatus of claim 7 wherein said light source comprises an element selected from the group consisting of optical fiber amplifiers, fiber lasers, semiconductor optical amplifiers, semiconductor lasers, and diode-pumped solid state lasers.

9. The apparatus of claim 7 wherein said beam-combining means comprises a fiber-optic coupler, wherein said reference optical fiber and said second optical fiber are joined by said fiber-optic coupler.

10. The apparatus of claim 9 wherein said fiber-optic coupler is a polarization maintaining fiber-optic coupler.

11. The apparatus of claim 1 wherein said scanning means comprises an arc-line scanning means interposed between said angled-dual-axis focusing means and said sample, wherein said arc-line scanning means causes said confocal overlapping volume to move across said sample in a direction substantially perpendicular to said illumination axis and said observation axis, thereby producing an arc-line scan.

12. The apparatus of claim 11 wherein said arc-line scanning means comprises one or more scanning elements selected from the group consisting of scanning mirrors, reflectors, acousto-optic deflectors, electro-optic deflectors, mechanical scanning mechanisms, and Micro-Electro-Mechanical-Systems (MEMS) scanning micro-mirrors.

13. The apparatus of claim 12 wherein said one or more scanning elements comprise a single scanning mirror, wherein said scanning mirror is flat and can be pivoted about one axis.

14. The apparatus of claim 13 wherein said scanning mirror is a silicon micro-machined mirror.

15. The apparatus of claim 12 wherein said one or more scanning elements comprise two scanning mirrors that are coplanar, wherein said scanning mirrors are flat and can co-rotate about one common axis.

16. The apparatus of claim 15 wherein said scanning mirrors are silicon micro-machined mirrors.

17. The apparatus of claim 12 wherein said one or more scanning elements comprise two scanning mirrors, wherein each of said scanning mirrors is flat and can be pivoted about one or more axes, and wherein said scanning mirrors are configured such that they can be operated in synchronous motion.

18. The apparatus of claim 17 wherein said scanning mirrors are silicon micro-machined mirrors.

19. The apparatus of claim 1 wherein said scanning means comprises a vertical scanning means, wherein said vertical scanning means comprises:

a) a vertical translation means; and b) a compensation means for ensuring said intersection of said illumination focal volume and said observation focal volume;

wherein said vertical translation means causes said angled-dual-axis focusing means and said first ends of first and second optical fibers to move in unity relative to said sample in a vertical direction, whereby said confocal overlapping volume deepens progressively into said sample, providing a vertical scan.

20. The apparatus of claim 19 wherein said compensation means comprises a fluid filling a space between said angled-dual-axis focusing means and said sample, wherein said fluid is transparent to said illumination beam and said observation beam, and wherein said fluid has an index of refraction that is the same as an index of refraction of said sample, such that the optical path lengths of said illumination beam and said observation beam remain unchanged in the course of said vertical scan.

21. The apparatus of claim 20 further comprising a window assembly interposed between said angled-dual-axis focusing means and said fluid for passage of said illumination beam and said observation beam.

22. The apparatus of claim 21 wherein said window assembly comprises a transparent flat window.

23. The apparatus of claim 21 wherein said window assembly comprises first and second transparent flat windows in an angled arrangement, such that said illumination axis is perpendicular to said first flat window and said observation axis is perpendicular to said second flat window.

24. The apparatus of claim 20 further comprising a transparent window interposed between said fluid and said sample for passage of said illumination beam and said observation beam.

25. The apparatus of claim 20 wherein said fluid is contained in a sealed hydraulic system, wherein said hydraulic system includes a reservoir for replenishing and receiving excess fluid in the course of said vertical scan.

26. The apparatus of claim 1 wherein said scanning means comprises a transverse scanning means, wherein said transverse scanning means causes said angled-dual-axis focusing means and said first ends of first and second optical fibers to move in unity relative to said sample along transverse directions that are substantially perpendicular to said vertical direction, whereby said confocal overlapping volume moves across said sample along said transverse directions, producing a transverse scan.

27. The apparatus of claim 1 wherein said angled-dual-axis focusing means comprises one or more elements selected from the group consisting of refractive lenses, diffractive lenses, GRIN lenses, focusing gratings, microlenses, holographic optical elements, binary lenses, curved mirrors, flat mirrors, and prisms.

28. The apparatus of claim 27 wherein said one or more elements comprise a single refractive lens, where said refractive lens provides said illumination axis and said observation axis.

29. The apparatus of claim 27 wherein said one or more elements comprise an illumination focusing element and an observation focusing element, wherein said illumination focusing element provides said illumination axis, and wherein said observation focusing element provides said observation axis.

30. The apparatus of claim 29 wherein said illumination focusing element and said observation focusing element are of the same type, comprising a focusing element selected from the group consisting of refractive lenses, diffractive lenses, GRIN lenses, micro-lenses, binary lenses, and curved mirrors.

31. The apparatus of claim 30 wherein said focusing element has a numerical aperture (NA) in the range of 0.1 to 0.4.

32. The apparatus of claim 29 further comprising a first collimating lens, wherein said first collimating lens receives said illumination beam from said first end of said first optical fiber and passes a collimated illumination beam to said illumination focusing element.

33. The apparatus of claim 32 further comprising a second collimating lens, wherein said second collimating lens receives said observation beam from said observation focusing element and focuses said observation beam to said first end of said second optical fiber.

34. The apparatus of claim 29 further comprising one or more mirrors for beam-aligning and beam-deflecting, wherein said one or more mirrors receive said illumination beam from said illumination focusing element and direct said illumination beam to said illumination focal volume within said sample, and wherein said one or more mirrors collect said observation beam emanated from said observation focal volume and pass said observation beam to said observation focusing element.

35. The apparatus of claim 1 wherein said angled-dual-axis focusing means and said first ends of said first and second optical fibers are mechanically coupled to a substrate.

36. The apparatus of claim 35 wherein said substrate comprises a silicon substrate etched with V-grooves.

37. The apparatus of claim 1 wherein said first and second optical fibers comprises one or more elements selected from the group consisting of single-mode fibers, polarization maintaining fibers, multi-mode fibers, and birefrigent fibers.

38. The apparatus of claim 37 wherein each of said first and second optical fibers comprises a single-mode fiber.

39. The apparatus of claim 1 wherein said observation beam comprises reflected light emanated from said confocal overlapping volume within said sample.

40. The apparatus of claim 1 wherein said illumination focal volume and said observation focal volume are diffraction-limited, determined by main lobes of said illumination beam's point-spread function and said observation beam's point-spread function.

41. The apparatus of claim 40 wherein said confocal overlapping volume is diffraction-limited.

42. The apparatus of claim 1 further comprising a frequency shifting means for shifting the frequency of said observation beam.

43. The apparatus of claim 42 wherein said frequency shifting means is optically coupled to said first optical fiber.

44. The apparatus of claim 42 wherein said frequency shifting means is optically coupled to said second optical fiber.

45. The apparatus of claim 42 wherein said frequency shifting means comprises an element selected from the group consisting of piezoelectric fiber stretchers, electro-optic phase modulators, and acousto-optic frequency shifters.

46. The apparatus of claim 1 further comprising a frequency shifting means optically coupled to said reference beam, for shifting the frequency of said reference beam.

47. The apparatus of claim 46 wherein said frequency shifting means comprises an element selected from the group consisting of piezoelectric fiber stretchers, electro-optic phase modulators, and acousto-optic frequency shifters.

48. The apparatus of claim 1 further comprising an optical amplifier optically coupled to said second optical fiber for amplifying said observation beam.

49. The apparatus of claim 1 further comprising an adjustable optical delay device optically coupled to said first optical fiber.

50. The apparatus of claim 1 further comprising an adjustable optical delay device optically coupled to said second optical fiber.

51. The apparatus of claim 1 further comprising an adjustable optical delay device for adjusting an optical path length of said reference beam.

52. The apparatus of claim 1 wherein said illumination beam is a polarized beam, and wherein said first and second optical fibers are polarization maintaining (PM) fibers capable of supporting two orthogonal polarizations.

53. The apparatus of claim 52 further comprising a polarization rotation means optically coupled to said reference beam, for rotating the polarization of said reference beam.

54. The apparatus of claim 53 wherein said polarization rotation means comprises an element selected from the group consisting of Faraday rotators, rotatable fiber-optic connectors, and half-wave birefrigent plates.

55. The apparatus of claim 52 further comprising a polarization rotation means optically coupled to said second optical fiber, for rotating the polarization of said observation beam.

56. The apparatus of claim 55 wherein said polarization rotation means comprises an element selected from the group consisting of Faraday rotators, rotatable fiber-optic connectors, and half-wave birefrigent plates.

57. The apparatus of claim 52 further comprising an auxiliary polarizing beamsplitter optically coupled to said second end of said second optical fiber.

58. The apparatus of claim 57 further comprising third and fourth PM fibers optically coupled to said auxiliary polarizing beamsplitter.

59. The apparatus of claim 58 further comprising an adjustable optical delay device optically coupled to said third PM fiber.

60. The apparatus of claim 58 further comprising an adjustable optical delay device optically coupled to said fourth PM fiber.

61. The apparatus of claim 58 wherein said third and fourth PM fibers are joined by a polarization maintaining fiber-optic coupler.

62. The apparatus of claim 52 further comprising an auxiliary polarizing beamsplitter optically coupled to said reference beam.

63. The apparatus of claim 62 further comprising fifth and sixth PM fibers optically coupled to said auxiliary polarizing beamsplitter.

64. The apparatus of claim 63 further comprising an adjustable optical delay device optically coupled to said fifth PM fiber.

65. The apparatus of claim 63 further comprising an adjustable optical delay device optically coupled to said sixth PM fiber.

66. The apparatus of claim 63 wherein said fifth and sixth PM fibers are joined by a polarization maintaining fiber-optic coupler.

67. The apparatus of claim 62 further comprising a reference PM fiber, wherein a first end of said reference PM fiber is optically coupled to said light-generating means for receiving said reference beam, and wherein a second end of said reference PM fiber is optically coupled to said auxiliary polarizing beamsplitter.

68. The apparatus of claim 2 wherein said light source comprises an unpolarized light source, wherein said beam-splitting means comprises a polarizing beamsplitter, and wherein said first, second and reference optical fibers comprise polarization maintaining fibers capable of supporting two orthogonal polarizations.

69. The apparatus of claim 2 wherein said light source comprises a polarized light source, wherein said beam-splitting means comprises a polarizing beamsplitter, and wherein said first, second and reference optical fibers comprise polarization maintaining fibers capable of supporting two orthogonal polarizations.

70. The apparatus of claim 2 wherein said light source comprises a polarized light source, wherein said beam-splitting means comprises a polarization maintaining fiber-optic coupler, and wherein said first, second and reference optical fibers comprise polarization maintaining fibers capable of supporting two orthogonal polarizations.

71. The apparatus of claim 2 wherein said light source has a coherence length less than 3000 microns.

72. The apparatus of claim 2 wherein said light source is capable of producing light in the wavelength range of 0.8 to 1.6 microns.

73. The apparatus of claim 7 wherein said light source comprises a polarized light source, and wherein said first, second and reference optical fibers comprise polarization maintaining fibers capable of supporting two orthogonal polarizations.

74. The apparatus of claim 7 wherein said light source has a coherence length less than 3000 microns.

75. The apparatus of claim 7 wherein said light source is capable of producing light in the wavelength range of 0.8 to 1.6 microns.

76. A method for performing angled-dual-axis optical coherence scanning microscopy within a sample, comprising:
  a) producing an illumination beam and a reference beam from a light-generating means, wherein said light-generating means has a predetermined coherence length;
  b) routing said reference beam along a reference path;
  c) transmitting said illumination beam along an illumination path including a first optical fiber;
  d) focusing said illumination beam emerging from said first optical fiber to an illumination focal volume along an illumination axis within said sample;
  e) receiving an observation beam emanated from an observation focal volume along an observation axis within said sample, wherein said illumination axis and said observation axis intersect at an angle within said sample, such that said illumination focal volume and said observation focal volume intersect at a confocal overlapping volume;
  f) focusing said observation beam substantially into a second optical fiber;
  g) combining said reference beam and said observation beam such that coherent interference is produced; and
  h) directing said illumination beam and said observation beam in such a way that said illumination axis and said observation axis remain intersecting at said angle and said confocal overlapping volume scans within said sample, while repeating said step g).

77. The method of claim 76 further comprising the step of compensating for the changes in optical path lengths of said illumination and observation beams in the course of scanning, so as to maintain said coherent interference.

78. The method of claim 76 further comprising the step of modulating the phase of said observation beam, such that said coherent interference between said reference beam and said observation beam is modulated at a beat frequency.

79. The method of claim 76 further comprising the step of modulating the phase of said reference beam, such that said coherent interference between said reference beam and said observation beam is modulated at a beat frequency.

80. The method of claim 76 further comprising the step of shifting the frequency of said observation beam, such that said coherent interference between said reference beam and said observation beam is modulated at a beat frequency.

81. The method of claim 76 further comprising the step of shifting the frequency of said reference beam, such that said coherent interference between said reference beam and said observation beam is modulated at a beat frequency.

82. The method of claim 76 further comprising the step of adjusting an optical path length traversed by said observation beam, so as to maintain said coherent interference between said reference beam and said observation beam when combined.

83. The method of claim 76 further comprising the step of adjusting an optical path length traversed by said reference beam, so as to maintain said coherent interference between said reference beam and said observation beam when combined.

84. The method of claim 76 further comprising the step of optically amplifying said observation beam.

85. The method of claim 76 further comprising:

a) polarizing said reference beam and said illumination beam such that said reference beam and said illumination beam are polarized beams;

b) rotating a polarization of said reference beam relative to said observation beam such that one polarization mode of said observation beam and said reference beam have substantially the same polarization; and c) combining said reference beam and said one polarization mode of said observation beam such that coherence interference is produced.

* * * * *